(12) United States Patent
Zhang et al.

(10) Patent No.: US 11,283,547 B2
(45) Date of Patent: Mar. 22, 2022

(54) DISCRETE FOURIER TRANSFORM-SPREAD (DFT-S) BASED INTERLACE PHYSICAL UPLINK CONTROL CHANNEL (PUCCH) WITH USER MULTIPLEXING

(71) Applicant: QUALCOMM INCORPORATED, San Diego, CA (US)

(72) Inventors: Xiaoxia Zhang, San Diego, CA (US); Jing Sun, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 16/566,676

(22) Filed: Sep. 10, 2019

(65) Prior Publication Data
US 2020/0083986 A1    Mar. 12, 2020

(30) Foreign Application Priority Data

Sep. 12, 2018 (IN) .............................. 201841034335

(51) Int. Cl.
| | |
|---|---|
| *H04L 1/00* | (2006.01) |
| *H04J 13/12* | (2011.01) |
| *H04J 13/00* | (2011.01) |
| *H04L 27/26* | (2006.01) |

(52) U.S. Cl.
CPC ........ *H04L 1/0064* (2013.01); *H04J 13/0074* (2013.01); *H04J 13/12* (2013.01); *H04L 27/2636* (2013.01)

(58) Field of Classification Search
CPC ................ H04L 1/0064; H04L 27/2636; H04J 13/0074; H04J 13/12
See application file for complete search history.

(56) References Cited

U.S. PATENT DOCUMENTS

| | | | |
|---|---|---|---|
| 2019/0007937 A1* | 1/2019 | Yang | ...................... H04W 16/14 |
| 2019/0141698 A1* | 5/2019 | Kim | ........................ H04L 5/001 |

OTHER PUBLICATIONS

International Search Report and Written Opinion—PCT/US2019/050640—ISA/EPO—dated Jan. 22, 2020.

(Continued)

*Primary Examiner* — Rhonda L Murphy
(74) *Attorney, Agent, or Firm* — Liem T. Do

(57) ABSTRACT

Wireless communications systems and methods related user multiplexing with discrete Fourier transform (DFT) pre-coded frequency interlaces are provided. A first wireless communication device identifies a first block-spreading code from a set of block-spreading codes associated with user multiplexing. The first wireless communication device communicates, with a second wireless communication device using a frequency interlace in a frequency spectrum, a first communication signal including a first block of information symbols spread across a set of resource blocks (RBs) within the frequency interlace based on the first block-spreading code. The first communication signal is generated by block-spreading the first block of information symbols based on the first block-spreading code to produce a first block of spread information symbols, performing a DFT on the first block of spread information symbols, and mapping the first block of spread information symbols to the set of RBs.

24 Claims, 18 Drawing Sheets

(56) References Cited

OTHER PUBLICATIONS

Nokia Siemens Networks, et al., "Details for Block Spread DFT-S-OFDMA", 3GPP TSG RAN WG1 Meeting #62, 3GPP Draft; R1-104429, 3rd Generation Partnership Project (3GPP), Mobile Competence Centre; 650, Route Des Lucioles; F-06921 Sophia-Antipolis Cedex; France, vol. RAN WG1, No. Madrid, Spain; Aug. 23, 2010, Aug. 17, 2010 (Aug. 17, 2010), 5 Pages, XP050449760, [retrieved on Aug. 17, 2010] the whole document.

Qualcomm Incorporated: "UL signals and Channels for NR-U", 3GPP TSG RAN WG1 Meeting #94, 3GPP Draft; R1-1809478 7.2.2.3.2 UL Signals and Channels for NR-U, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018, Aug. 17, 2018 (Aug. 17, 2018), 11 Pages, XP051516840, Retrieved from the Internet: URL: http://www.3gpp.org/ftp/tsg%5Fran/WG1%5FRL1/TSGR1%5F94/Docs/R1%2D1809478%2Ezip [retrieved on Aug. 17, 2018] Sections 2.1 and 2.2.

* cited by examiner

DISCRETE FOURIER TRANSFORM-SPREAD (DFT-S) BASED INTERLACE PHYSICAL UPLINK CONTROL CHANNEL (PUCCH) WITH USER MULTIPLEXING

CROSS REFERENCE TO RELATED APPLICATIONS

The present application claims priority to and the benefit of the Indian Provisional Patent Application No. 201841034335, filed Sep. 12, 2018, which is hereby incorporated by reference in its entirety as if fully set forth below and for all applicable purposes.

TECHNICAL FIELD

This application relates to wireless communication systems, and more particularly to improving user multiplexing with discrete Fourier transform (DFT) precoded frequency interlaces.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Some spectrums may have certain power spectral density (PSD) requirements. For example, the European Telecommunications Standard Institute (ETSI) document EN 301893 V2.1.1 specifies various PSD limits for sub-6 GHz frequency bands and the ETSI draft document EN 302 567 V2.0.22 specifies a maximum equivalent isotropic radiated power (EIRP) and an EIRP density for 60 GHz frequency bands. Some other frequency bands, such as citizens broadband radio service (CBRS) bands at about 3.5 GHz, may not restrict transmissions to a particular PSD limit. In general, different spectrums may have different PSD requirements and/or different bandwidth occupancy requirements.

One approach to meeting the PSD requirement of a frequency spectrum and allowing a wireless communication device to transmit in the frequency spectrum at a full transmit power is to spread the frequency occupancy of a transmission signal over a wider bandwidth. However, the spreading of the frequency occupancy reduces the number of users that can be frequency-multiplexed in the frequency spectrum.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes identifying, by a first wireless communication device, a first block-spreading code from a set of block-spreading codes associated with user multiplexing; and communicating, by the first wireless communication device with a second wireless communication device using a frequency interlace in a frequency spectrum, a first communication signal including a first block of information symbols spread across a set of resource blocks (RBs) within the frequency interlace based on the first block-spreading code.

In an additional aspect of the disclosure, an apparatus includes a processor configured to identify a first block-spreading code from a set of block-spreading codes associated with user multiplexing; and a transceiver configured to communicate, with a first wireless communication device using a frequency interlace in a frequency spectrum, a first communication signal including a first block of information symbols spread across a set of resource blocks (RBs) within the frequency interlace based on the first block-spreading code.

In an additional aspect of the disclosure, a computer-readable medium having program code recorded thereon, the program code includes code for causing a first wireless communication device to identify a first block-spreading code from a set of block-spreading codes associated with user multiplexing; and code for causing the first wireless communication device to communicate, with a second wireless communication device using a frequency interlace in a frequency spectrum, a first communication signal including a first block of information symbols spread across a set of resource blocks (RBs) within the frequency interlace based on the first block-spreading code.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
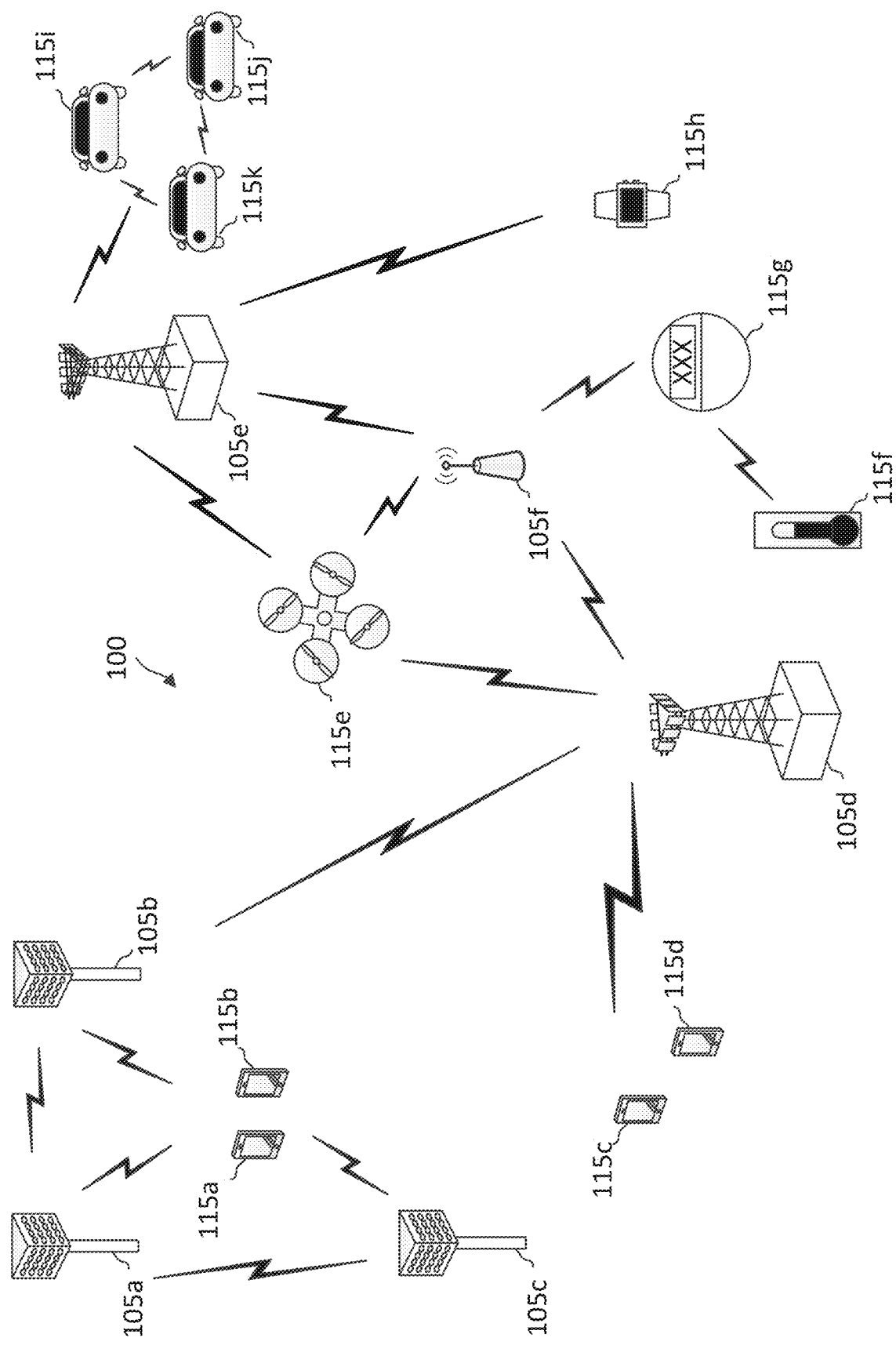
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for improving user multiplexing with DFT precoded frequency interlaces. For example, a BS may assign multiple UEs to transmit uplink information on the same frequency interlace. The BS may assign different UEs with different block-spreading codes that are orthogonal to each other. The block-spreading codes can be orthogonal cover codes (OCCs). A UE may generate a block of information symbols carrying uplink information (e.g., control information). The UE may apply block-spreading to the information symbols using an assigned block-spreading code. The UE may perform DFT spreading or DFT precoding on the block of spread information symbols to produce a frequency signal. The UE may map the frequency signal to the frequency interlace. The block-spreading, the DFT, and the frequency interlace mapping operations in effect spread the block of information across the entire DFT precoded frequency interlace.

In an embodiment, the UE may further perform time-domain spreading across multiple time-domain symbols (e.g., single carrier-frequency division multiplexing (SC-FDM) symbols). In an embodiment, the UE may further perform code-hopping across multiple time-domain symbols. While the disclosed embodiments are described in the context of physical uplink control channel (PUCCH) transmissions in a shared spectrum or an unlicensed spectrum, the disclose embodiments can be applied to any channel signal transmissions, such as physical uplink shared channel (PUSCH) transmissions, in any spectrum.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

During the normal operation stage, the UE 115 may transmit UL control information to a BS 105 over a PUCCH. The BS 105 may schedule the UE 115 for UL transmissions based on the received UL control information. Some examples of UL control information may include scheduling requests (SRs), channel state information (CSI)-reports, and/or hybrid automatic repeat request (HARQ) feedbacks (e.g., acknowledgements (ACKs) and/or not-ACKs). In some instances, a BS 105 may assign multiple UEs 115 with the same PUCCH resources (e.g., time-frequency resources) using multiplexing schemes.

In an embodiment, the network 100 may operate over various frequency bands, for example, in frequency ranges between about 2 GHz to above 60 GHz. Different frequency bands may have different PSD requirements. For example, certain frequency bands may have a maximum allowable PSD level of about 10 decibel-milliwatts per megahertz (dBm/MHz) to about 17 dBm/MHz. Thus, a transmitter having a full power of about 23 dBm may or may not be able to utilize the full power for a signal transmission depending on the signal frequency bandwidth. To satisfy a certain PSD requirement in a frequency spectrum, a transmitter (e.g., the BSs 105 and the UEs 115) may distribute the frequency occupancy of a transmission signal over a wider bandwidth. For example, a transmitter may transmit a signal over multiple narrow frequency bands spaced apart from each other in a frequency bandwidth at a higher power than transmitting the signal over contiguous frequencies.

In an embodiment, a BS 105 may configure UEs 115 to communicate PUCCH information using frequency interlaces, where the PUCCH information may be distributed across the entire frequency interlace to increase bandwidth occupancy, for example, to meet certain PSD requirements. The BS may assign multiple UEs 115 on the same frequency interlace by using DFT precoding with block-spreading OCCs as described in greater detail herein.

Figure 2:
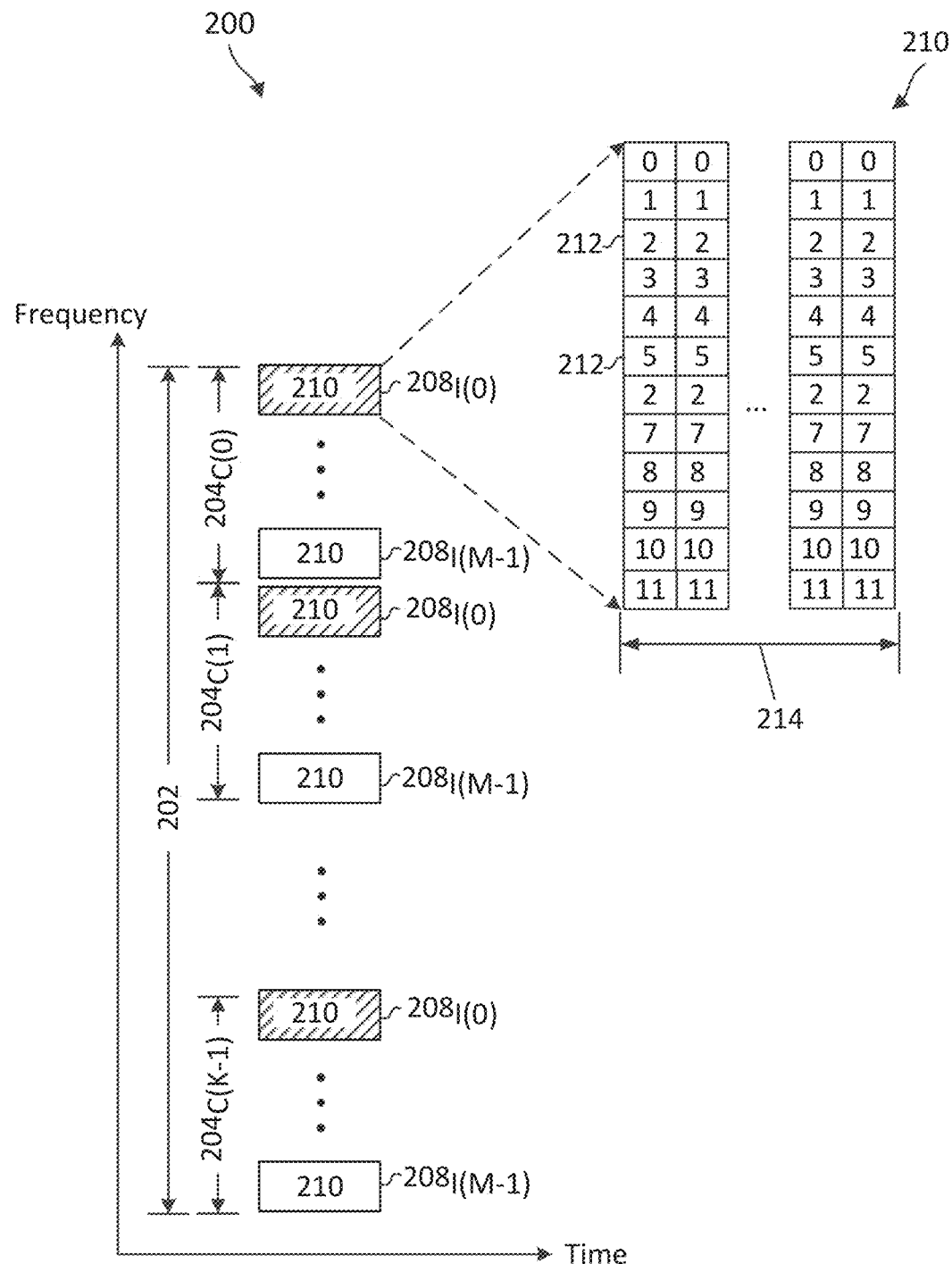
FIG. 2 illustrates a resource configuration scheme with frequency interlaces according to some embodiments of the present disclosure.

FIG. 2 illustrates a resource configuration scheme with frequency interlaces according to some embodiments of the present disclosure. In FIG. 2, the x-axis represents time in some constant units and the y-axis represents frequency in some constant units. The scheme 200 may be employed by BSs such as the BSs 105 and UEs such as the UEs 115 in a network such as the network 100 to communicate with each other over a frequency spectrum 202. The frequency spectrum 202 may have a bandwidth of about 10 megahertz (MHz) or about 20 MHz and a subcarrier spacing (SCS) of about 15 kilohertz (kHz), about 30 kHz, or about 60 kHz. The frequency spectrum 202 may be located at any suitable frequencies. In some embodiments, the frequency spectrum 202 may be located at about 3.5 GHz, 6 GHz, or 60 GHz. The scheme 200 allocates resources in units of frequency interlaces 208.

The frequency interlaces are shown as $208_{I(0)}$ to $208_{I(M-1)}$, where M is a positive integer. Each frequency interlace 208 may include K plurality of RBs 210 evenly spaced over the frequency spectrum 202, where K is a positive integer. In other words, the RBs 210 in a particular frequency interlace $208_{I(i)}$ are spaced apart from each other by at least one other RB 210, where i may vary between 0 and M−1. The values K and M may vary based on several factors, such as the bandwidth, the subcarrier spacing (SCS), and/or the PSD limitation of the frequency spectrum 202, as described in greater detail herein. In some instances, the value K may also vary for different interlaces.

A group of M localized RBs 210 forms a cluster 204. As shown, the frequency interlaces $208_{I(0)}$ to $208_{I(M-1)}$ form K clusters $204_{C(0)}$ to $204_{C(K-1)}$. Each RB 210 may span about twelve contiguous subcarriers 212 in frequency and a time period 214. The subcarriers 212 are indexed from 0 to 11. The time period 214 may span any suitable number of OFDM symbols 216. In some embodiments, the time period 214 may correspond to one transmission time interval (TTI), which may include about fourteen OFDM symbols 216.

The number of clusters 204 or the value of K may be dependent on the amount of frequency distribution required to maintain a certain PSD level. As an example, the scheme 200 may divide the frequency spectrum 202 into about ten clusters 204 (e.g., K=10) and distribute an allocation over the ten clusters 204 to increase a frequency occupancy of the allocation. In an embodiment, the frequency spectrum 202 may have a bandwidth of about 20 MHz and each subcarrier 212 may span about 15 kHz in frequency. In such an embodiment, the frequency spectrum 202 may include about ten frequency interlaces 208 (e.g., M=10). For example, an allocation may include one frequency interlace 208 having ten distributed or equally spaced RBs 210. Compared to an allocation with a single RB or ten localized RBs, the interlaced allocation with the ten distributed RBs 210 allows a UE to transmit at a higher power while maintaining the same PSD level.

In another embodiment, the frequency spectrum 202 may have a bandwidth of about 10 MHz and each subcarrier 212 may span about 15 kHz in frequency. In such an embodiment, the frequency spectrum 202 may include about five frequency interlaces 208 (e.g., M=5). Similarly, an allocation may include one frequency interlace 208 having ten distributed RBs 210. The interlaced allocation with the ten distributed RBs may allow for better power utilization than an allocation with a single RB or ten localized RBs at the same PSD level In another embodiment, the frequency spectrum 202 may have a bandwidth of about 20 MHz and each subcarrier 212 may span about 30 kHz in frequency. In such an embodiment, the frequency spectrum 202 may include about five frequency interlaces 208 (e.g., M=5). Similarly, an allocation may include one frequency interlace 208 having ten distributed RBs 210. The interlaced allocation with the ten distributed RBs may allow for better power utilization than an allocation with a single RB or ten localized RBs at the same PSD level.

The use of frequency interlacing to distribute an allocation into a wider bandwidth allows a transmitter to transmit at a higher power level than when an allocation occupies contiguous frequencies. As an example, the frequency spectrum 202 may have a maximum allowable PSD level of about 13 dBm/MHz and a transmitter (e.g., the UEs 115) may have a power amplifier (PA) capable of transmitting at about 23 dBm. Distributing frequency occupancy of an allocation into five clusters 204 may allow the transmitter to transmit at about 20 dBm (e.g., with a power boost of about 7 dB) while maintaining a PSD level of about 13 dBm/MHz. Distributing frequency occupancy of an allocation into ten clusters 204 may allow the transmitter to transmit at a full power of about 23 dBm (e.g., with a power boost of about 10 dB) while maintaining a PSD level of about 13 dBm/MHz. Thus, the use of frequency interlacing can provide better power utilization.

In an embodiment, the scheme 200 may be applied to a PUCCH to provide a power boost at a transmitter (e.g., the UEs 115). For example, one RB 210 may be sufficient to carry UCI of a particular PUCCH format signal. However, in order to meet the PSD requirement, a UE may extend the frequency occupancy of the PUCCH signal from one RB 210 to K RBs 210 by transmitting the PUCCH signal using one frequency interlace 208. As noted earlier, interlaced waveforms can improve link budget for better coverage under PSD limit as it allows UE to transmit at a higher power level. However, with interlaced waveforms, each PUCCH occupies a greater number of RBs compared to a non-interlaced allocation. For example, the number of UEs that can be multiplexed over the frequency spectrum 202 for PUCCH signal transmissions may be reduced by a factor of about K if each UE only required one RB when there were no constraints on PSD.

One approach to increasing user multiplexing capacity in a frequency interlace 208 is to assign different UEs with different OCCs so that transmissions from the different UEs may not interfere with each other. Further, DFT spreading can be applied to reduce the peak-to-average power ratio (PAPR) of the transmissions. Thus, the OCC spreading can be referred to as a pre-DFT-OCC spreading.

FIGS. 3A, 3B, 4A, and 4B illustrate mechanisms for applying pre-DFT-OCC spreading to increase user multiplexing capacity. For example, a BS may assign multiple UEs on the same frequency interlace (e.g., the frequency interlace $208_{I(i)}$) for PUCCH transmissions and may assign each UE with a different OCC. The plots 350 in the right-side of FIGS. 3A and 3B and the plots 450 in the right-side of FIGS. 4A and 4B include x-axes representing time in some constant units and y-axes representing frequency in some constant units.

Figure 3A:
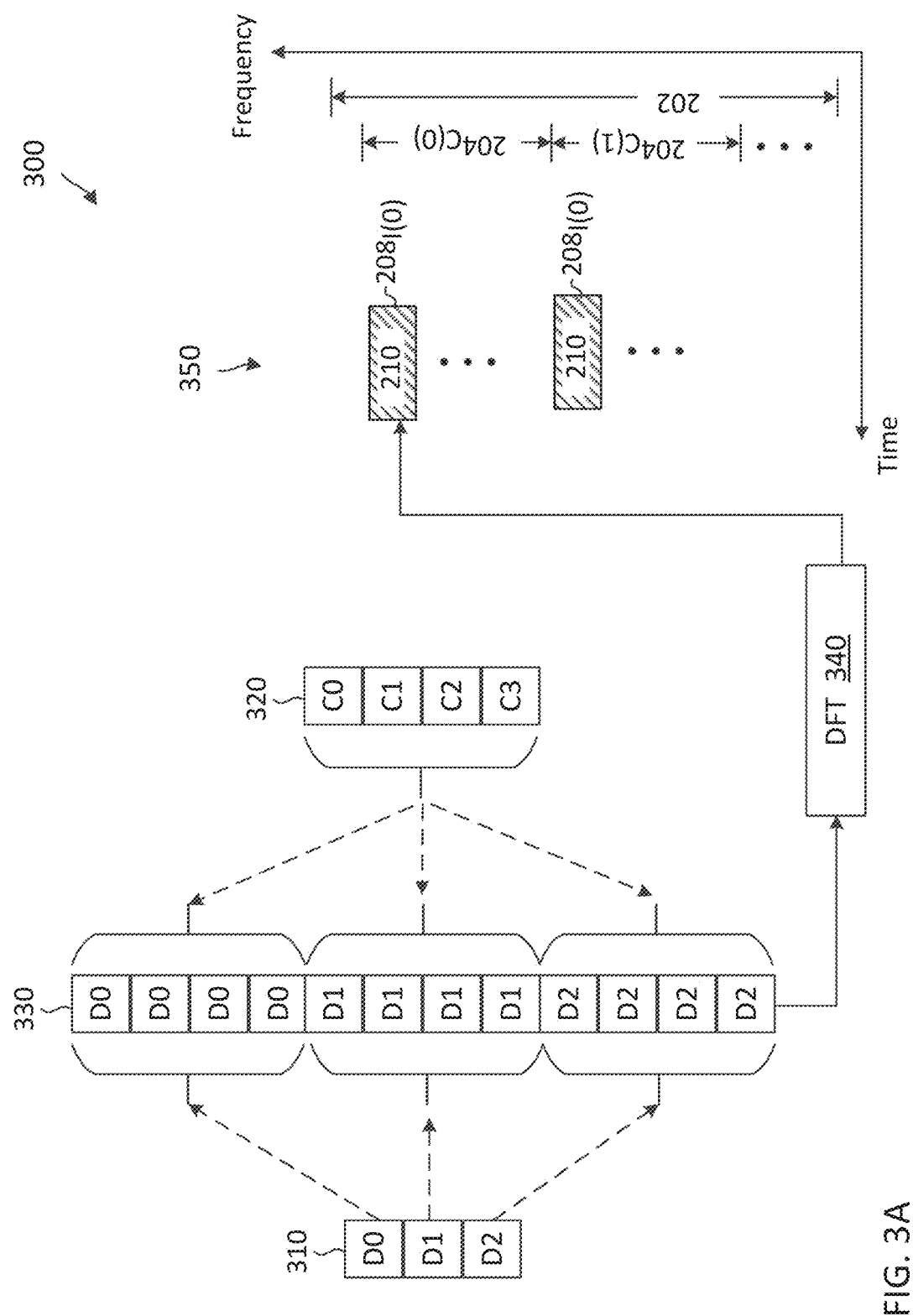
FIG. 3A illustrates a transmission scheme with pre-Discrete Fourier transform-orthogonal cover code (pre-DFT-OCC) spreading according to some embodiments of the present disclosure.

FIG. 3A illustrates a transmission scheme 300 with pre-DFT-OCC spreading according to some embodiments of the present disclosure. The scheme 300 may be employed by BSs such as the BSs 105 and UEs such as the UEs 115 in a network such as the network 100 for PUCCH transmissions. The scheme 300 can be used in conjunction with the scheme 200. For simplicity of discussions, FIG. 3A illustrates three information symbols 310 shown as D0, D1, and D2 spread by a length-4 OCC 320 shown as C0, C1, C2, C3 across a cluster 204 prior to a DFT spreading. However, the embodiments of the present disclosure may scale to spread any suitable number of information symbols 310 (e.g., 1, 2, 4, 5, or more) using an OCC 320 of any suitable length (e.g., 2, 3, or more) across a cluster 204. Additionally, the scheme 300 is described using the frequency interlace structure in FIG. 2, and may use the same reference numerals as in FIG. 2 for simplicity sake.

For example, a UE generates three information symbols 310 carrying uplink control information (UCI). The information symbols 310 may be modulation symbols. The UE spreads each information symbol 310 by the OCC 320 and then concatenates the spread symbols 330 to form a sequence. In other words, the scheme 300 performs pre-DFT-OCC spreading based on symbol repetitions. The sequence of spread symbols 330 can be represented by {D0×C0, D0×C1, D0×C2, D0×C3, D1×C0, D1×C1, D1×C2, D1×C3, D2×C0, D2×C1, D2×C2, D2×C3}. The sequence of spread symbols 330 can be further spread by a DFT 340. The DFT output can be mapped to an RB 210 of an assigned frequency interlace $208_{I(0)}$ within a cluster $204_{c(0)}$ as shown in the in plot 350.

The scheme 300 may be extended to map more information symbols 310 over the entire frequency interlace $208_{I(0)}$. For example, the UE may further generate information symbols D3, D4, and D5 (e.g., the information symbols 310) and apply the scheme 300 to spread the information symbols D3, D4, and D5 using the OCC 320 across a portion of the frequency interlace $208_{I(0)}$ within another cluster 204 (e.g., the cluster $204_{c(1)}$). In other words, each symbol D3, D4, and D5 are repeated and then multiplied by the OCC 320. Accordingly, the spreading by the OCC 320 produces a sequence {D3×C0, D3×C1, D3×C2, D3×C3, D4×C0, D4×C1, D4×C2, D4×C3, D5×C0, D5×C1, D5×C2, D5×C3}.

Figure 3B:
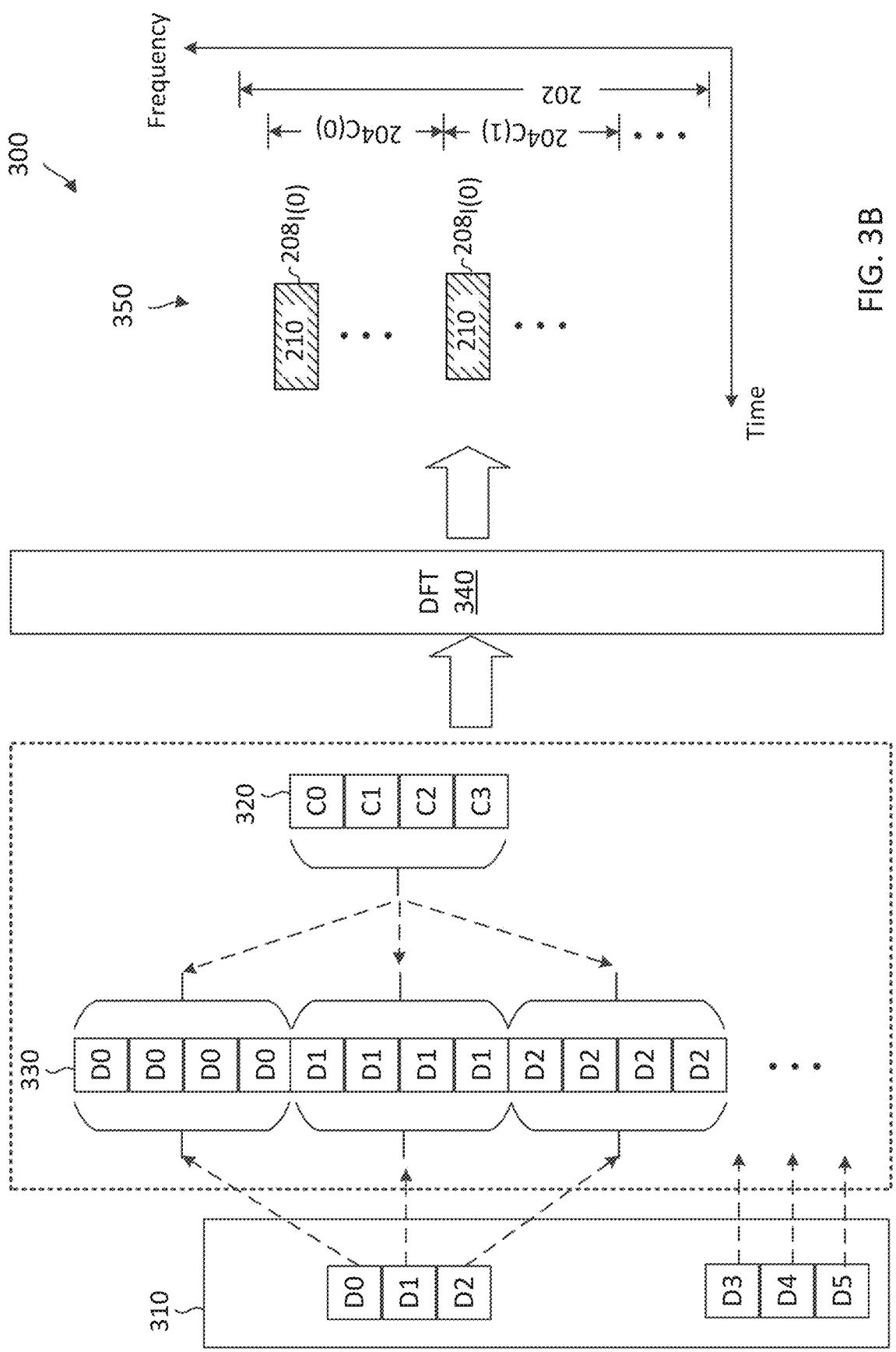
FIG. 3B illustrates a transmission scheme with pre-DFT-OCC spreading according to some embodiments of the present disclosure.

FIG. 3B is similar to FIG. 3A, but shows additional aspects of the scheme 300 (e.g., pre-DFT-OCC spreading for more information symbols 310). As shown in FIG. 3B, pre-DFT-OCC spreading can be applied to information symbols 310 including D0, D1, D2, D3, D4, and D5. The pre-DFT-OCC spreading based on symbol repetitions in time and spreading by the OCC 320 (shown by the dotted-line box) as discussed above in FIG. 3A can be applied to the information symbols 310. After the spreading by the OCC 320, the DFT 340 is applied to the sequence of spread symbols {D0×C0, D0×C1, D0×C2, D0×C3, D1×C0, D1×C1, D1×C2, D1×C3, D2×C0, D2×C1, D2×C2, D2×C3, D3×C0, D3×C1, D3×C2, D3×C3, D4×C0, D4×C1, D4×C2, D4×C3, D5×C0, D5×C1, D5×C2, D5×C3}. In general, for N+1 information symbols 310, the sequence of symbols spread by the OCC 320 can be represented as {D0×C0, D0×C1, D0×C2, D0×C3, . . . , DN×C0, DN×C1, DN×C2, DN×C3} and the DFT 340 is applied across the sequence of spread symbols. The output of the DFT 340 is mapped to RBs 210 of the frequency interlace $208_{I(0)}$ as shown in the plot 350.

Figure 4A:
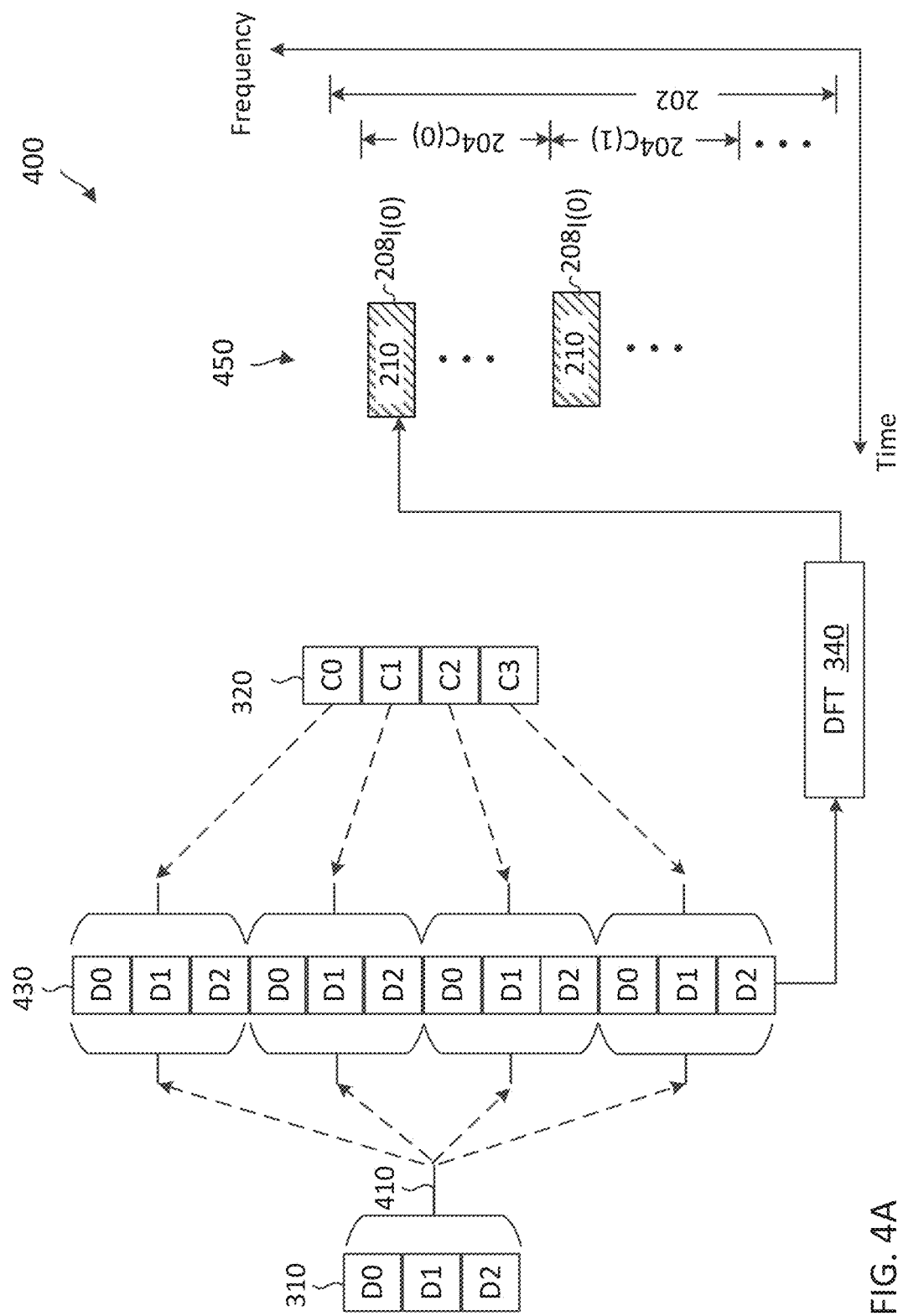
FIG. 4A illustrates a transmission scheme with pre-DFT-OCC spreading according to some embodiments of the present disclosure.

FIG. 4A illustrates a transmission scheme 400 with pre-DFT-OCC spreading according to some embodiments of the present disclosure. The scheme 400 may be employed by BSs such as the BSs 105 and UEs such as the UEs 115 in a network such as the network 100 for a PUCCH transmission. The scheme 400 can be used in conjunction with the scheme 200. The scheme 400 is described using a similar configuration as the scheme 300, where three information symbols 310 are spread by a length-4 OCC 320 shown as C0, C1, C2, C3 across a cluster 204 prior to a DFT spreading. Further, the scheme 400 is described using the frequency interlace structure in FIG. 2, and may use the same reference numerals as in FIG. 2 for simplicity sake.

However, the scheme 400 performs the pre-DFT-OCC spreading using block repetitions instead of symbol repetitions.

As shown in FIG. 4A, the UE spreads the information symbols 310 as a block 410 by the OCC 320 to form a sequence of block-spread symbols 430. The block-spread symbols 430 can be represented by {D0×C0, D1×C0, D2×C0, D0×C1, D1×C1, D2×C1, D0×C2, D1×C2, D2×C2, D0×C3, D1×C3, D2×C3}. Similar to the scheme 300, the block-spread symbols can be further spread by a DFT 340 and the DFT output can be mapped to an RB 210 of an assigned frequency interlace $208_{I(0)}$ within a cluster $204_{c(0)}$ as shown in the in plot 450.

The UE may further generate information symbols D3, D4, and D5 (e.g., the information symbols 310) and repeat the scheme 400 to spread the information symbols D3, D4, and D5 as a block using the OCC 320 across a portion of the frequency interlace $208_{I(0)}$ within another cluster 204 (e.g., $204_{c(1)}$). Accordingly, the spreading by the OCC 320 produces a sequence {D3×C0, D4×C0, D5×C0, D3×C1, D4×C1, D5×C1, D3×C2, D4×C2, D5×C2, D3×C3, D4×C3, D5×C3}

Figure 4B:
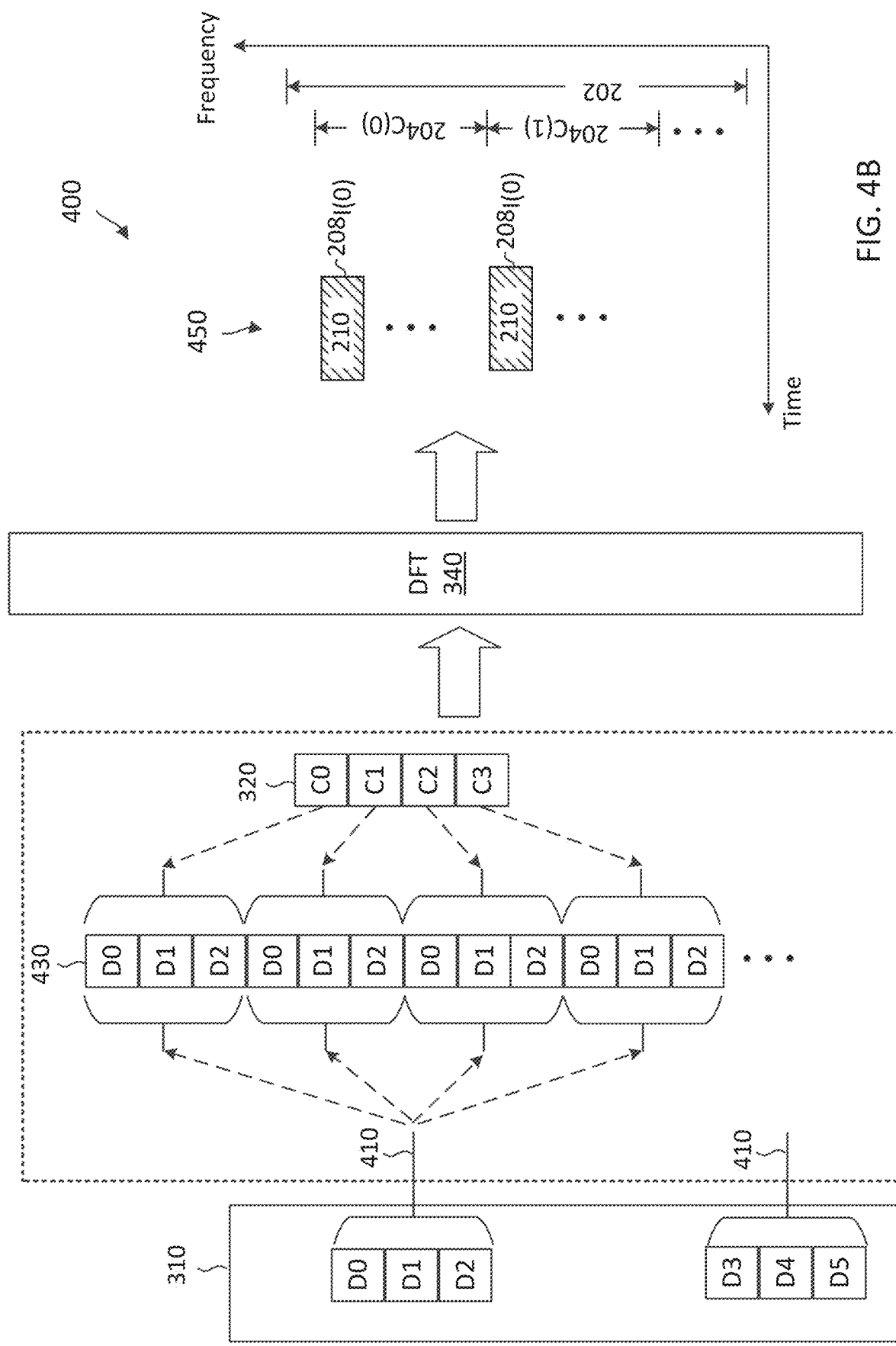
FIG. 4B illustrates a transmission scheme with pre-DFT-OCC spreading according to some embodiments of the present disclosure.

FIG. 4B is similar to FIG. 4A, but shows additional aspects of the scheme 400 (e.g., pre-DFT-OCC spreading for more information symbols 310). As shown in FIG. 3B, pre-DFT-OCC spreading can be applied to information symbols 310 including D0, D1, D2, D3, D4, and D5. The pre-DFT-OCC spreading based on block repetitions in time and spreading by the OCC 320 (shown by the dotted-line box) as discussed above in FIG. 4A can be applied to the information symbols 310. After the spreading by the OCC 320, the DFT 340 is applied to the sequence of spread symbols {D0×C0, D1×C0, D2×C0, D0×C1, D1×C1, D2×C1, D0×C2, D1×C2, D2×C2, D0×C3, D1×C3, D2×C3, D3×C0, D4×C0, D5×C0, D3×C1, D4×C1, D5×C1, D3×C2, D4×C2, D5×C2, D3×C3, D4×C3, D5×C3}. In general, for N+1 information symbols 310, the sequence of spread symbols can be represented as {D0×C0, D1×C0, D2×C0, . . . , DN×C3} and the DFT 340 is applied across the sequence of spread symbols. The output of the DFT 340 is mapped to RBs 210 of the frequency interlace $208_{I(0)}$ as shown in the plot 450.

One drawback of the schemes 300 and 400 is that while the per cluster OCC spreading can provide orthogonality among transmissions from multiple users, the subsequent DFT spreading may not preserve the code-division multiplexing (CDM) orthogonality provided by the OCCs. In other words, the DFT output may include tones or resource elements (REs) (e.g., the subcarriers 212) that carry useful signals from two or more UEs, causing interference among the UEs and degrading performance. In order to achieve a good performance without degradation, additional receiver processing (e.g., including a joint equalizer across UEs) can be applied. However, the complexity of the receive may increase, and thus may not be desirable.

Accordingly, the present disclosure provides techniques to perform pre-DFT-OCC for an increased user multiplexing capacity, but without the complex receiver processing or degraded performance as in the schemes 300 and 400.

Figure 5:
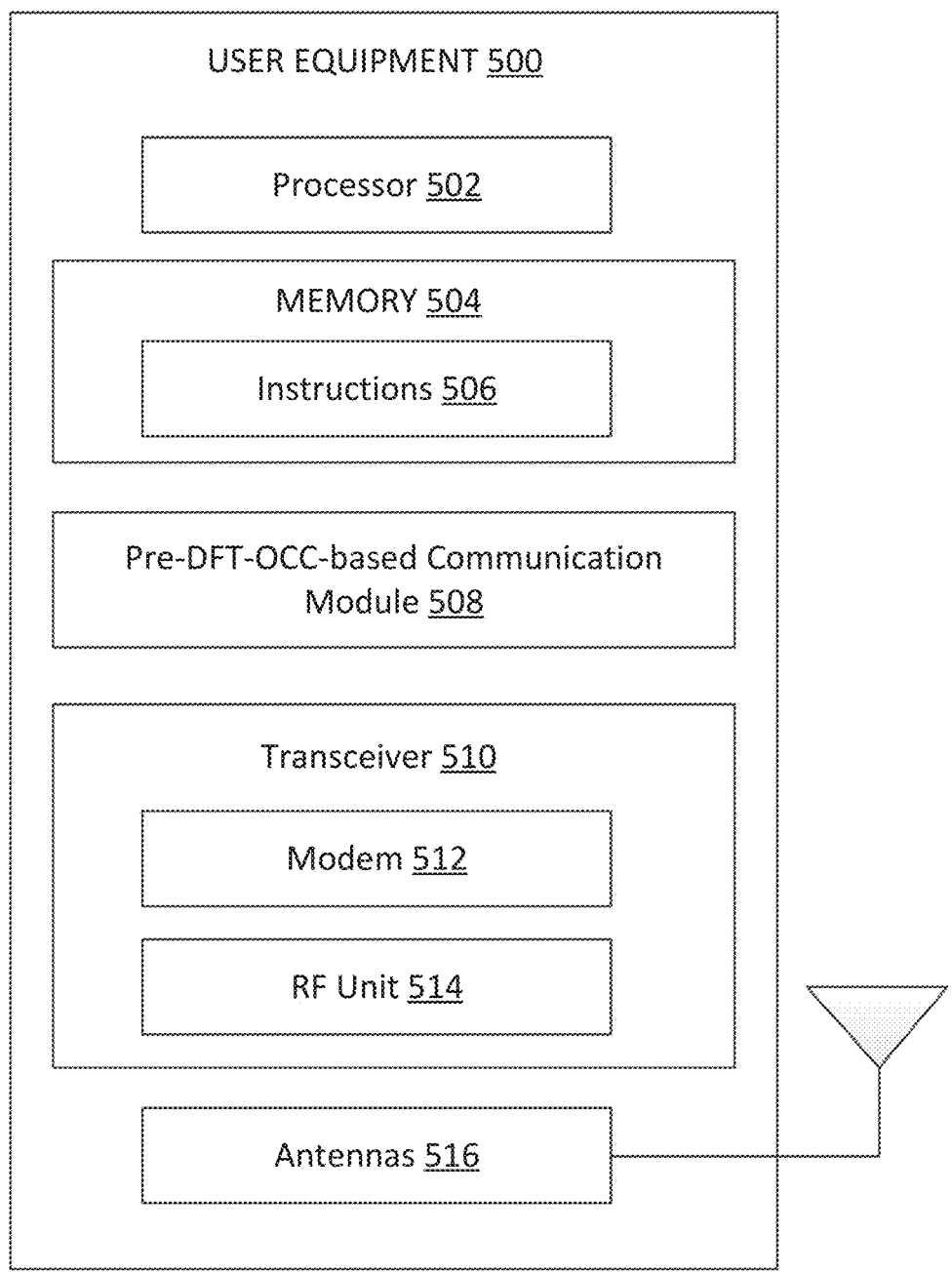
FIG. 5 is a block diagram of a user equipment (UE) according to some embodiments of the present disclosure.

FIG. 5 is a block diagram of an exemplary UE 500 according to embodiments of the present disclosure. The UE 500 may be a UE 115 as discussed above. As shown, the UE 500 may include a processor 502, a memory 504, a pre-DFT-OCC-based communication module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 115 in connection with embodiments of the present disclosure. Instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The pre-DFT-OCC-based communication module 508 may be implemented via hardware, software, or combinations thereof. For example, the pre-DFT-OCC-based communication module 508 may be implemented as a processor, circuit, and/or instructions 506 stored in the memory 504 and executed by the processor 502. The pre-DFT-OCC-based communication module 508 may be used for various aspects of the present disclosure. For example, the pre-DFT-OCC-based communication module 508 is configured to receive an allocation for a transmission on a frequency interlace (e.g., the frequency interlace 208) and an OCC (e.g., the OCCs 320) from a BS (e.g., the BSs 105), generate information symbols (e.g., the information symbols 310), perform a block-spreading of the information symbols across the entire frequency interlace using the OCC, perform a DFT spreading after the OCC block-spreading, map the DFT output to the frequency interlace, transmit a signal including the pre-DFT-OCC block-spread information symbols to the BS, as described in greater detail herein.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504, and/or the pre-DFT-OCC-based communication module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The antennas 516 may include multiple antennas of similar or different designs in order to sustain multiple transmission links. The RF unit 514 may configure the antennas 516.

Figure 6:
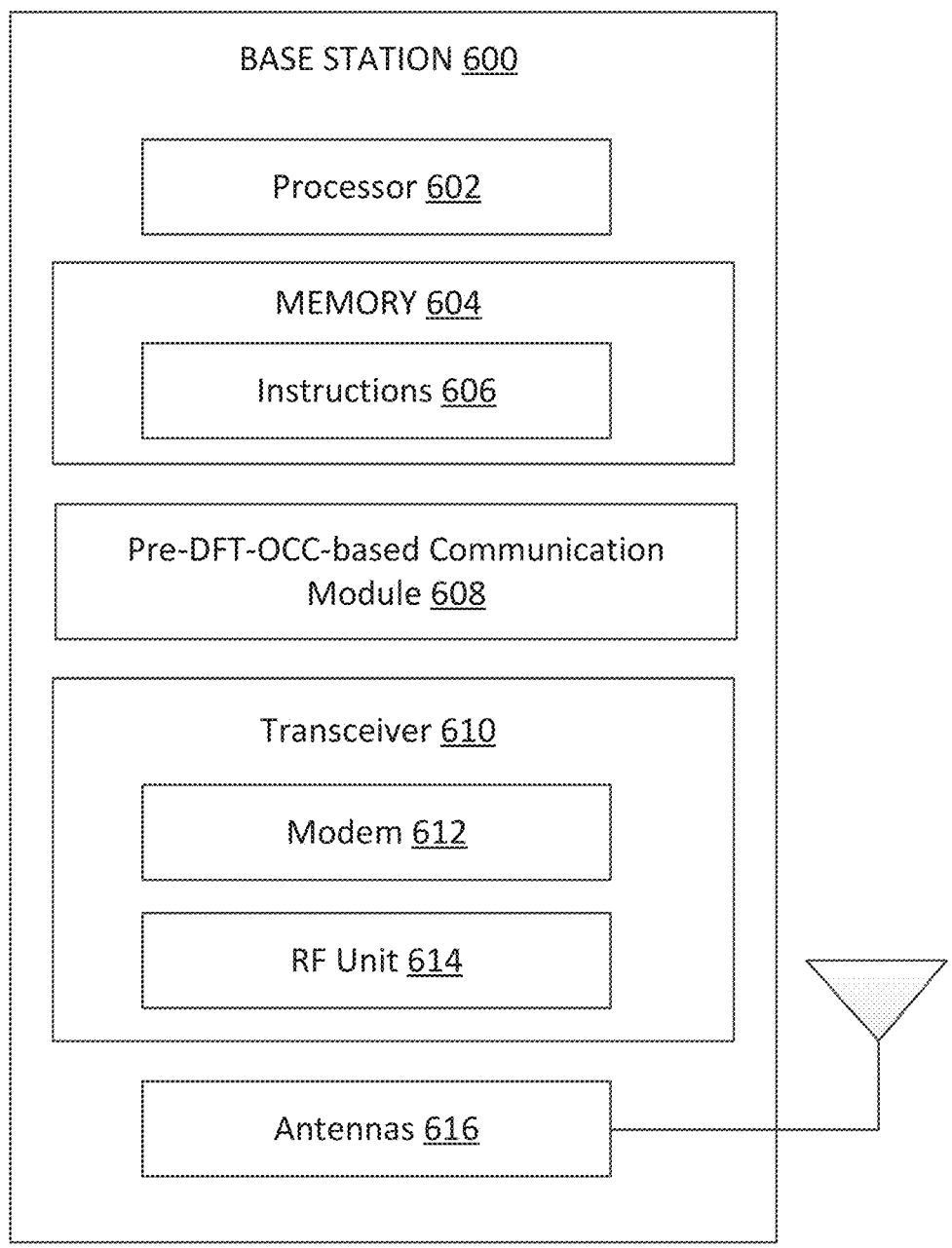
FIG. 6 is a block diagram of an exemplary base station (BS) according to some embodiments of the present disclosure.

FIG. 6 is a block diagram of an exemplary BS 600 according to embodiments of the present disclosure. The BS 600 may be a BS 105 as discussed above. As shown, the BS 600 may include a processor 602, a memory 604, a pre-DFT-OCC-based communication module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 5.

The pre-DFT-OCC-based communication module 608 may be implemented via hardware, software, or combinations thereof. For example, the pre-DFT-OCC-based communication module 608 may be implemented as a processor, circuit, and/or instructions 606 stored in the memory 604 and executed by the processor 602. The pre-DFT-OCC-based communication module 608 may be used for various aspects of the present disclosure. For example, the pre-DFT-OCC-based communication module 608 is configured to multiplex multiple UEs (e.g., the UEs 115 and 500) on the same frequency interlace (e.g., the frequency interlace 208), assign each UE with an OCC (e.g., the OCC 320) for block-spreading information symbols (e.g., the information symbols 310) across the entire frequency interlace, receive a signal from the UE including pre-DFT-OCC block-spread information symbols, and/or process the received signal based on a certain set of tones or subcarriers dependent on the OCC assigned to the corresponding UE, as described in greater detail herein.

As shown, the transceiver 610 may include the modem subsystem 612 and the RF unit 614. The transceiver 610 can be configured to communicate bi-directionally with other devices, such as the UEs 115 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to embodiments of the present disclosure. The antennas 616 may further receive data messages transmitted from other devices and provide the received data messages for processing and/or demodulation at the transceiver 610. The antennas 616 may include multiple antennas of similar or different designs in order to sustain multiple transmission links.

Figure 7:
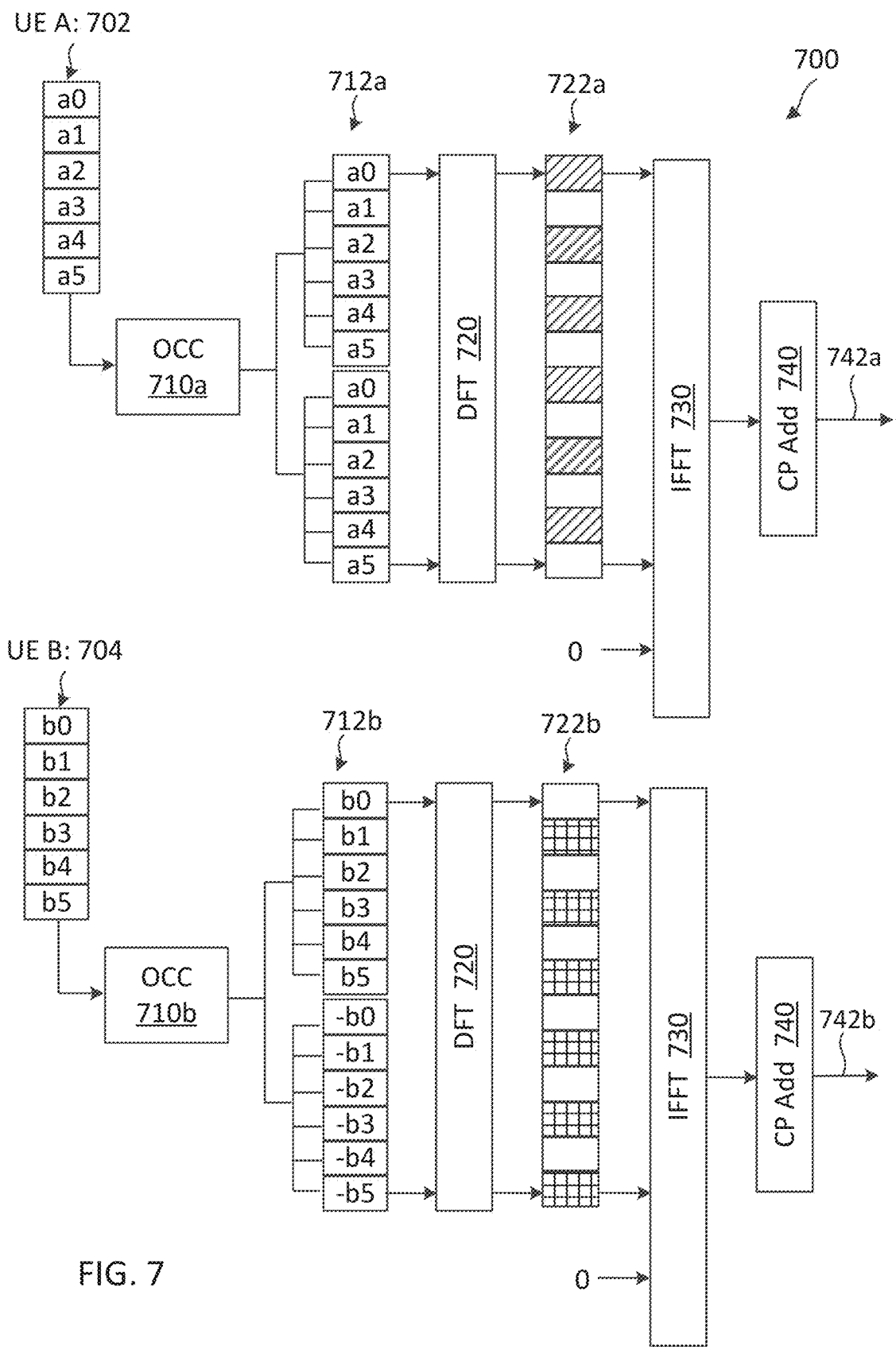
FIG. 7 illustrates a user multiplexing scheme using discrete Fourier transform (DFT) precoding with orthogonal cover codes (OCCs) according to some embodiments of the present disclosure.

FIG. 7 illustrates a user multiplexing scheme 700 using DFT precoding with OCCs according to some embodiments of the present disclosure. The scheme 700 may be employed by BSs such as the BSs 105 and 600 and UEs such as the UEs 115 and 500 in a network such as the network 100. The scheme 700 multiplexes a UE A and a UE B on the same resource (e.g., the same RB 210). The scheme 700 applies OCC block-spreading across the entire set of RBs 210. A BS may assign the UE A and the UE B with different OCCs. The BS may assign the UE A with an OCC 710a represented by {1, 1}. The BS may assign the UE B with an OCC 710b represented by {1, −1}.

The UE A generates information symbols 702 shown as a0, a1, a2, a3, a4, and a5 (e.g., the information symbols 310). The UE A applies an OCC 710a to block-spread the information symbols 702 in a time domain to form a sequence of block-spread symbols 712a. The block-spread symbols 712a, denoted as $S_0$, can be expressed as shown below:

$$S_0 = a_0, a_1, a_2, a_3, a_4, a_5, a_0, a_1, a_2, a_3, a_4, a_5. \quad (1)$$

The UE A performs DFT spreading to the block-spread symbols 712a by applying a DFT 720 (e.g., the DFT 340). Based on the FFT property described in greater detail below, the DFT output 722a, denoted as DFT($S_0$), is located on even tones (e.g., the subcarriers 212) as shown by the pattern-filled boxes. The UE A maps the DFT output 722a to an assigned RB (e.g., RB 210) and performs an inverse fast Fourier transform (IFFT) 730 to transform the DFT output 722a into a time domain signal, which may be referred as an SC-FDM symbol or a DFT-spreading-OFDM (DFT-s-OFDM) symbol. Accordingly, the time-domain signal may be referred to as a SC-FDM waveform signal or a DFT-s-OFDM waveform signal. The UE A applies a cyclic prefix (CP) add operation 740 to the time domain signal. The CP add operation 740 copies an end portion of the time domain signal to the beginning of the time domain signal. The UE A transmits the CP-added signal (e.g., an output signal 742a) to the BS.

Similarly, the UE B generates information symbols 704 shown as b0, b1, b2, b3, b4, and b5 (e.g., the information symbols 310). The UE B applies an OCC 710b to block-spread the information symbols 704 to form a sequence of block-spread symbols 712b. The block-spread symbols 712b, denoted as $S_1$, can be expressed as shown below:

$$S_1 = b_0, b_1, b_2, b_3, b_4, b_5, -b_0, -b_1, -b_2, -b_3, -b_4, -b_5. \quad (2)$$

The UE B performs DFT spreading to the block-spread symbols 712b by applying a DFT 720. Based on the FFT property as described in greater detail below, the DFT output 722b, denoted as DFT($S_1$), is located on odd tones (e.g., the subcarriers 212) as shown by the pattern-filled boxes. The UE B maps the DFT output 722b to the same RB that is assigned to the UE A. Subsequently, the UE B applies an IFFT 730, followed by a CP add operation 740 to produce an output signal 742b. The UE B transmits the output signal 742b to the BS.

The FFT properties for the DFT output 722a (e.g., with even tones) at the UE A and the FFT properties for the DFT output 722b (e.g., with odd tones) at the UE B can be derived by examining FFT operations. For example, given a discrete time signal $x_n$, where $n = 0, \ldots, N-1$, the FFT of $x_n$, denoted as $X_k$, is given by:

$$X_k = \sum_{n=0}^{N-1} x_n e^{-j\frac{2\pi k n}{N}}, k = 0, \ldots, N-1, \quad (3)$$

where n represents the time indices and k represents the frequency indices.

When $x_n = x_{n+N/2}$, as in the signal 712a generated by the UE A, the DFT output 722a can be expressed as shown below:

$$X_k = \sum_{n=0}^{\frac{N}{2}-1} x_n e^{-j\frac{2\pi k n}{N}} + \sum_{n=0}^{\frac{N}{2}-1} x_n e^{-j\frac{2\pi k (n+\frac{N}{2})}{N}} \quad (4)$$

$$= \sum_{n=0}^{\frac{N}{2}-1} x_n e^{-j\frac{2\pi k n}{N}} + (-1)^k \sum_{n=0}^{\frac{N}{2}-1} x_n e^{-j\frac{2\pi k n}{N}}.$$

As can be observed in Equation (4), when k is odd, $X_k = 0$. Thus, the DFT output 722a includes non-zero values in even tones only.

Similarly, when $x_n = -x_{n+N/2}$, as in the signal 712b generated by the UE B, the DFT output 722b can be expressed as shown below:

$$X_k = \sum_{n=0}^{\frac{N}{2}-1} x_n e^{-j\frac{2\pi k n}{N}} + (-1)^{k+1} \sum_{n=0}^{\frac{N}{2}-1} x_n e^{-j\frac{2\pi k n}{N}}. \quad (5)$$

As can be observed in Equation (5), when k is even, $X_k = 0$. Thus, the DFT output 722a includes non-zero values in odd tones only. As can be further observed from Equations (4) and (5), the pre-DFT-OCC user multiplexing is equivalent to comb-based (e.g., FDM) user multiplexing as described in greater detail herein.

Figure 8A:
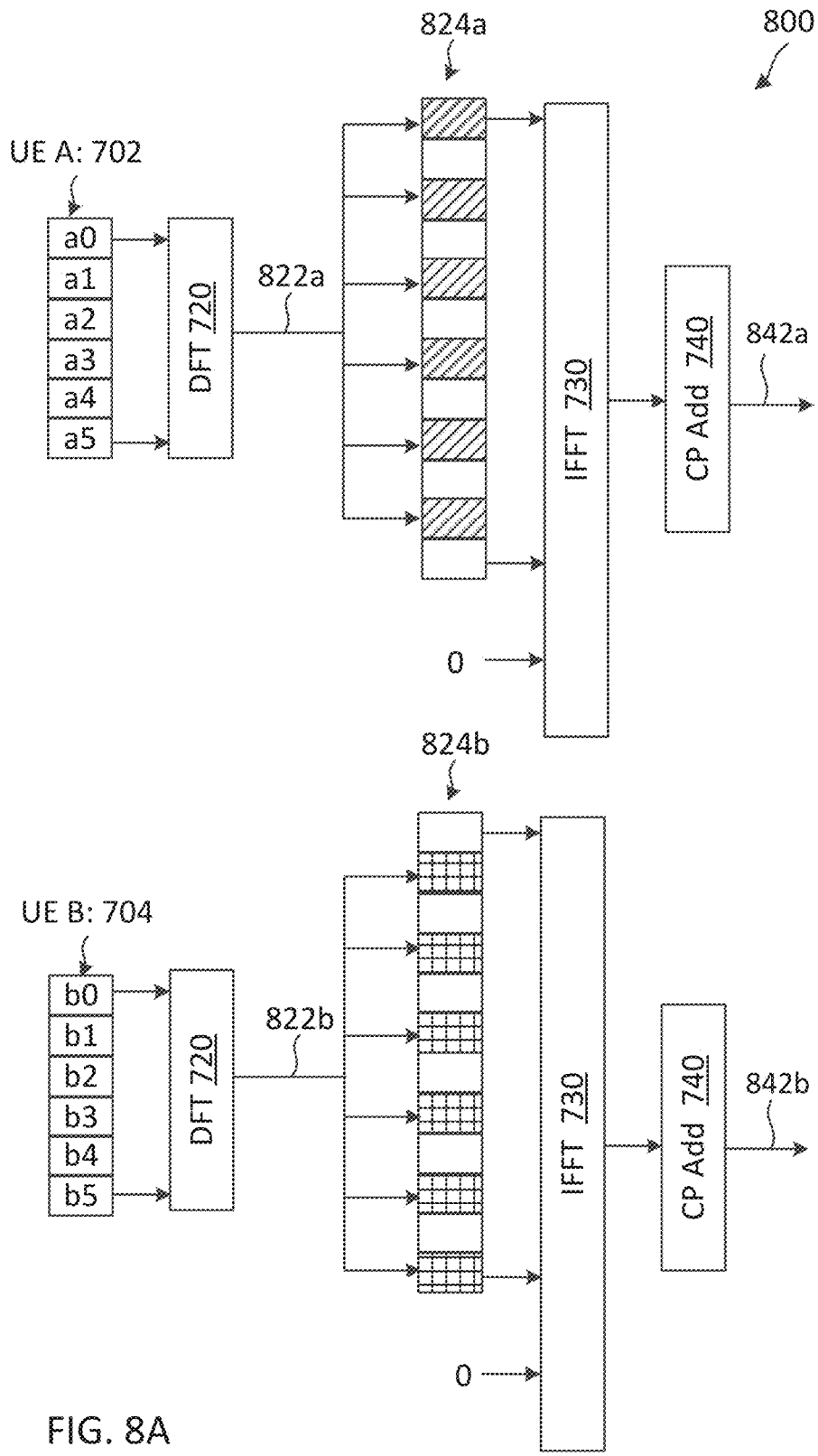
FIG. 8A illustrates a user multiplexing scheme using frequency division multiplexing (FDM) according to some embodiments of the present disclosure.

FIG. 8A illustrates a user multiplexing scheme 800 using FDM according to some embodiments of the present disclosure. The scheme 800 uses a substantially similar transmission chain as the scheme 700, but without the pre-DFT-OCC spreading as in the scheme 700. As shown in FIG. 8A, a UE A generates information symbols 702 shown as a0, a1, a2, a3, a4, and a5. The UE A applies a DFT 720 to the information symbols 702. The UE A maps the DFT output 822a to even tones (e.g., subcarriers 212) within an assigned RB (e.g., the RB 210) to form a frequency signal 824a. Subsequently, the UE A applies an IFFT 730, followed by a CP add operation 740 to produce an output signal 842a.

Similarly, a UE B generates information symbols 704 shown as b0, b1, b2, b3, b4, and b5. The UE B applies a DFT 720 to the information symbols 704. The UE B maps the DFT output 822b to odd tones in the same RB that is assigned to the UE A to form a frequency signal 824b. Subsequently, the UE B applies an IFFT 730, followed by a CP add operation 740 to produce an output signal 842b.

Figure 8B:
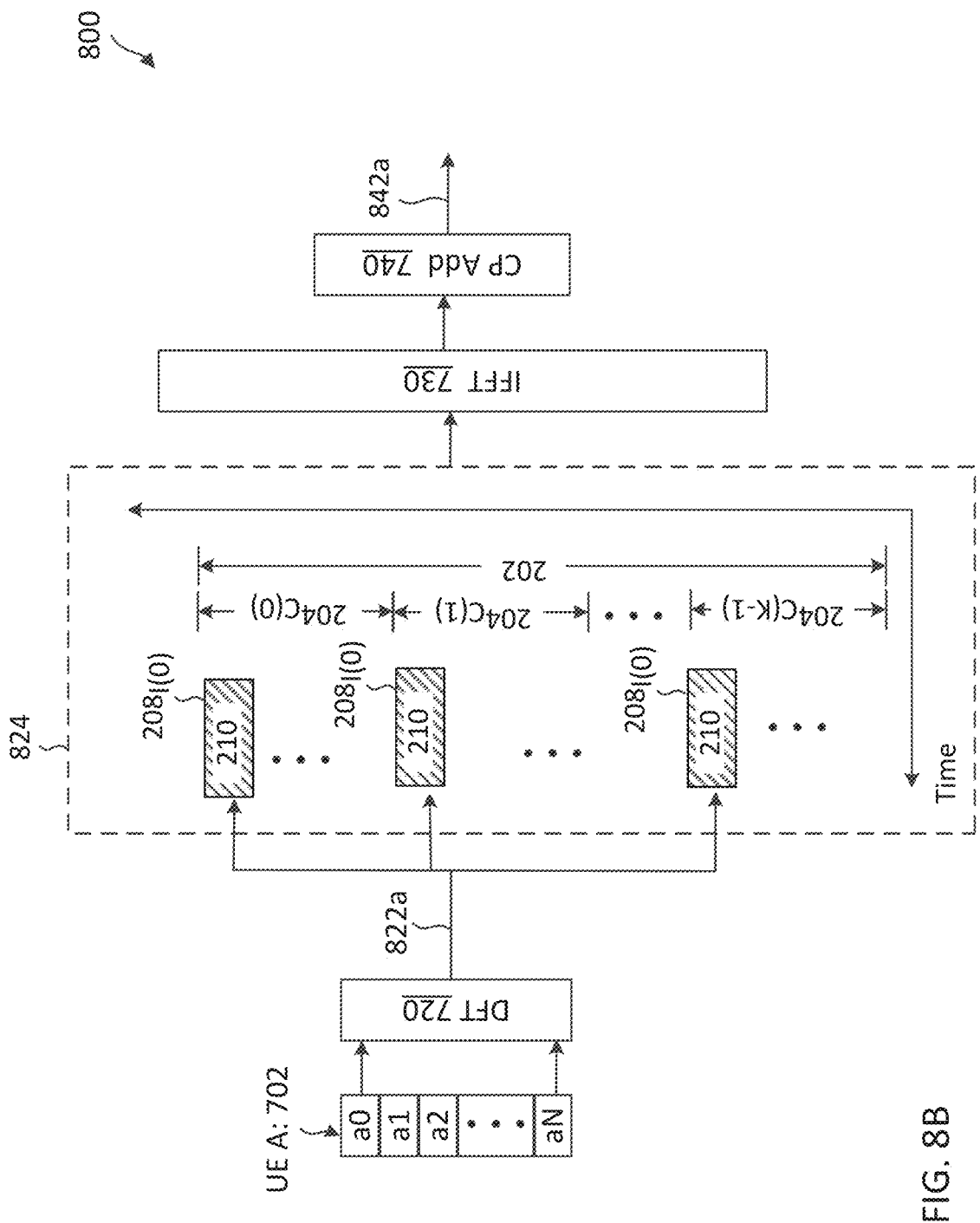
FIG. 8B illustrates a user multiplexing scheme using FDM according to some embodiments of the present disclosure.
Figure 8C:
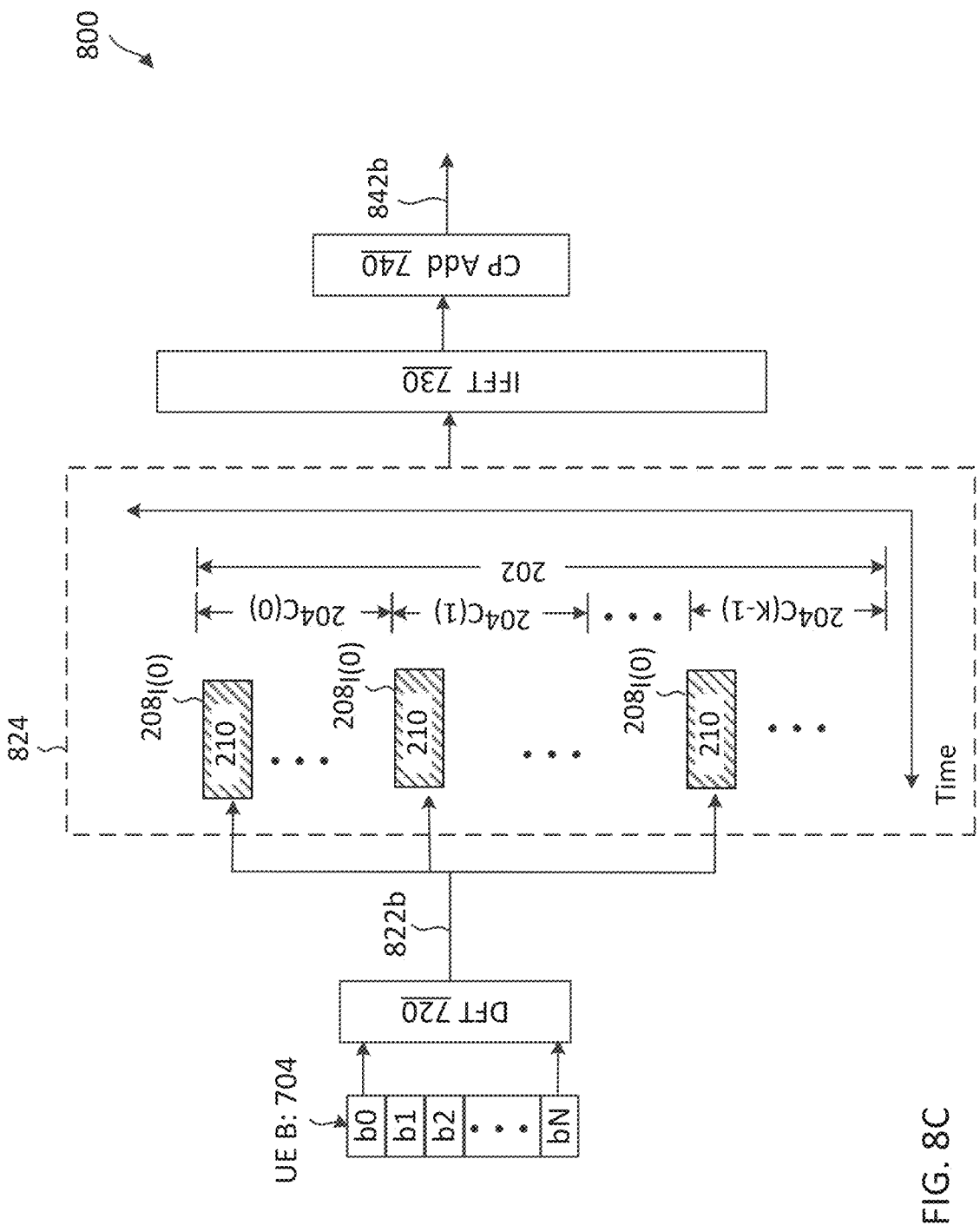
FIG. 8C illustrates a user multiplexing scheme using FDM according to some embodiments of the present disclosure.

FIGS. 8B and 8C are similar to FIG. 8A, but provide a view of the FDM mechanisms of scheme 800 shown in FIG. 8A with mapping to a frequency interlace $208_{I(0)}$ assigned to the UE A (FIG. 8B) and the UE B (FIG. 8C). As shown in FIG. 8B, the UE A generates N+1 number of information symbols 702, shown as {a0, a1, a2, . . . , aN}, applies the DFT 720 to the information symbols 702, and maps the DFT output 822a to even tones (e.g., subcarriers 212) of RBs 210 within the frequency interlace $208_{I(0)}$ (as shown by interlace mapping 824). Subsequently, the UE A applies an IFFT 730, followed by a CP add operation 740 to produce an output signal 842a.

Similarly, in FIG. 8C, the UE B generates N+1 number of information symbols 704, shown as {b0, b1, b2, . . . , bN}, applies the DFT 720 to the information symbols 704, and maps the DFT output 822b to odd tones (e.g., subcarriers 212) of RBs 210 within the frequency interlace $208_{I(O)}$ (as shown by mapping 824). Subsequently, the UE B applies an IFFT 730, followed by a CP add operation 740 to produce an output signal 842b. The N value may be dependent on the number of RBs 210 in the frequency interlace $208_{I(O)}$ and the number of UEs multiplexed on the frequency interlace $208_{I(O)}$.

As can be observed from the schemes 700 and 800, the pre-DFT-OCC spreading followed by the DFT spreading in the scheme 700 produce a similar orthogonal transmission structure among UEs as the FDM in the scheme 800.

Accordingly, to multiplex four UEs, the Fourier basis can be used for OCC spreading with codes [1,1,1,1], [1,j,−1,−j], [1,−1,1,−1], [1,−j,−1j]. In other words, the OCC (e.g., the OCCs 320 and/or 710) can be a DFT sequence. Then, following the same FFT analysis and parallelism between the pre-DFT-OCC with DFT spreading and the FDM discussed above, it can be shown that the four UEs are frequency-division multiplexed every fourth subcarriers (e.g., the subcarriers 212) and therefore the orthogonality between the UEs still holds regardless of the channel delay spread. Similar analysis may hold for other OCC spreading codes, for example, with a length of 6 or a length of 12.

Figure 9A:
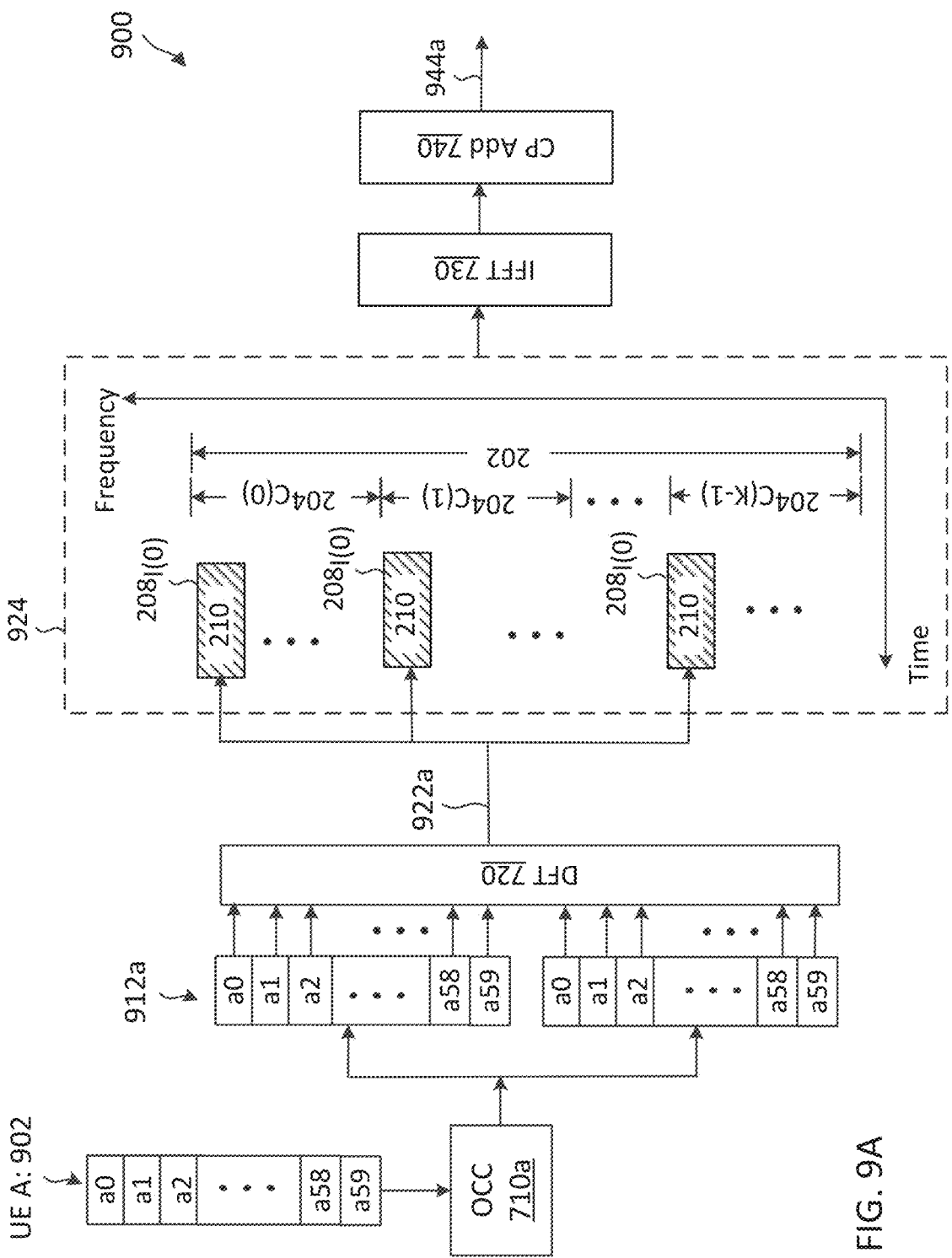
FIG. 9A illustrates a transmission scheme for multiplexing multiple UEs on a DFT precoded interlace according to some embodiments of the present disclosure.
Figure 9B:
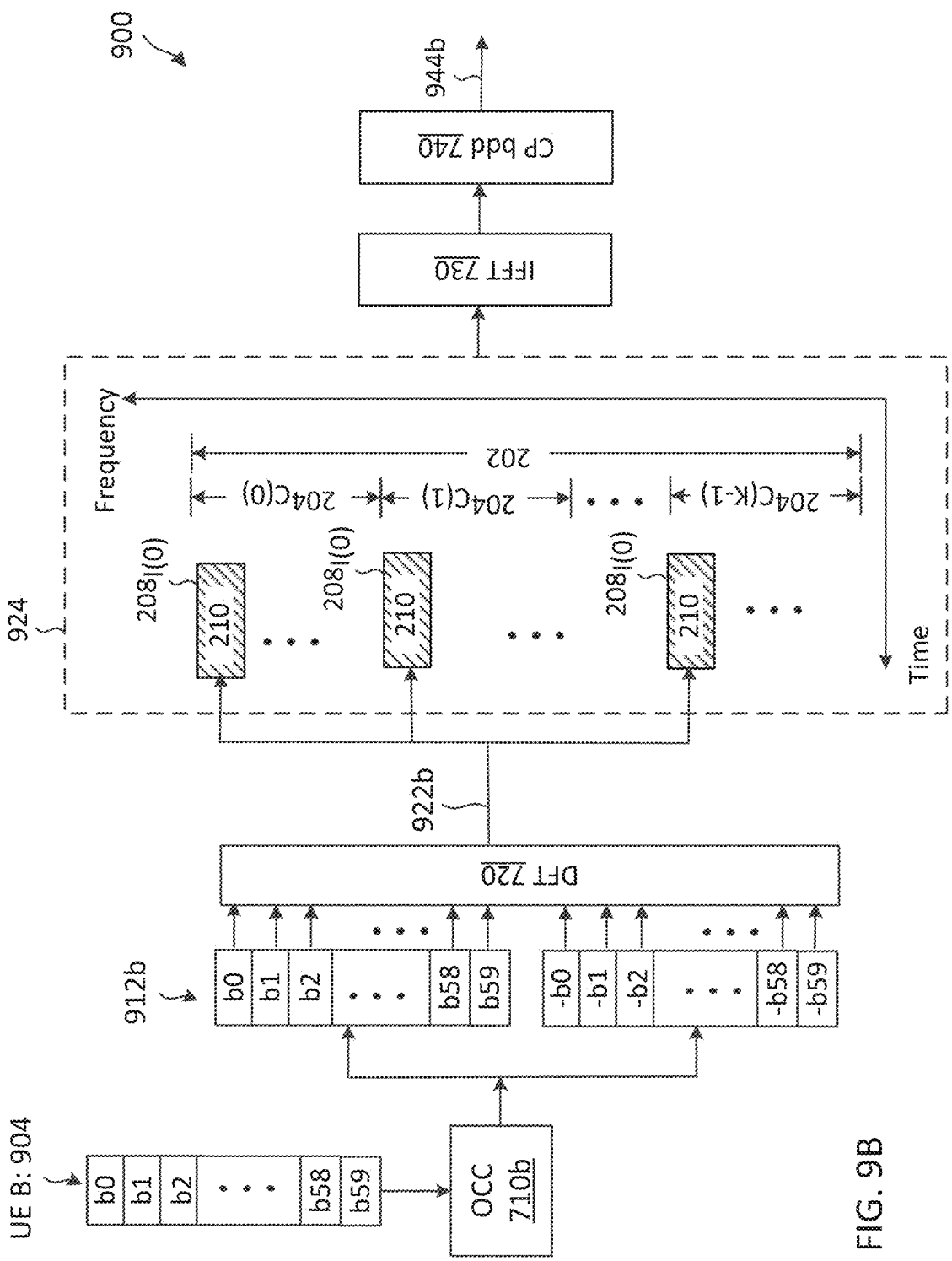
FIG. 9B illustrates a transmission scheme for multiplexing multiple UEs on a DFT precoded interlace according to some embodiments of the present disclosure.

FIGS. 9A and 9B collectively illustrate a scheme 900 for multiplexing multiple users on a DFT precoded frequency interlace. The scheme 900 may be employed by BSs such as the BSs 105 and 600 and UEs such as the UEs 115 and 500 in a network such as the network 100. The scheme 900 is substantially similar to the scheme 700. However, the scheme 900 multiplexes a UE A and a UE B on a same frequency interlace 208 including a set of distributed RBs 210. The scheme 900 applies OCC block-spreading across the set of distributed RBs in the entire frequency interlace 208. Similar to the scheme 700, the UE A may be assigned with the OCC 710a represented by {C0=1, C1=1} and the UE B may be assigned with the OCC 710b represented by {C0=1, C1=−1}. Additionally, the scheme 900 is described using the frequency interlace structure in FIG. 2, and may use the same reference numerals as in FIG. 2 for simplicity sake.

FIG. 9A illustrates a transmission scheme implemented by the UE A for multiplexing the UE A and the UE B on a DFT precoded interlace according to some embodiments of the disclosure. The UE A generates information symbols 902 shown as a0 to a59 (e.g., the information symbols 310, 702, and 704). The UE A applies the OCC 710a to block-spread the information symbols 902 to form a sequence of block-spread symbols 912a. The block-spread symbols 912a, denoted as $S_0$, is shown below:

$$S_0 = a_0, a_1, a_2, \ldots a_{58}, a_{59}, a_0, a_1, a_2, \ldots a_{58}, a_{59} \quad (6)$$

The UE A applies a DFT 720 to the block-spread symbols 912a for a DFT spreading. The UE A performs a frequency interlace mapping 924 to map the DFT output 922a to a frequency interlace $208_{I(O)}$, for example, based on an allocation from the BS. Based on the FFT property analysis discussed above with respect to Equations (4) and (5), the DFT output 922a includes non-zero values in even tones (e.g., the subcarriers 212) only. Subsequently, the UE A applies an IFFT 730 and a CP add operation 740 as in the scheme 700 to generate an output signal 944a for transmission.

FIG. 9B illustrates a transmission scheme implemented by the UE B for multiplexing the UE A and the UE B on a DFT precoded interlace according to some embodiments of the disclosure. The UE B generates information symbols 904 shown as b0 to b59 (e.g., the information symbols 310, 702, and 704). The UE B applies the OCC 710b to block-spread the information symbols 904 to form a sequence of block-spread symbols 912b. The block-spread symbols 912b, denoted as $S_1$, can be expressed as shown below:

$$S_1 = b_0, b_1, b_2, \ldots b_{58}, b_{59}, -b_0, -b_1, -b_2, \ldots, -b_{58}, -b_{59}. \quad (7)$$

The UE B performs DFT spreading to the block-spread symbols 912b by applying a DFT 720. The UE B performs a frequency interlace mapping 924 to map the DFT output 922b to the same frequency interlace $208_{I(O)}$. Based on the FFT property analysis discussed above with respect to Equations (4) and (5), the DFT output 922b includes non-zero values in odd tones only. Subsequently, the UE B applies an IFFT 730 and CP add operation 740 generate an output signal 944b for transmission.

As discussed above, the pre-DFT-OCC spreading followed by the DFT spreading in the scheme 700 produce a similar orthogonal transmission structure among UEs as the FDM in the scheme 800. Accordingly, the multiplexing of users or UEs on the DFT precoded frequency interlaces shown in FIGS. 9A and 9B may have a substantially similar orthogonal transmission structure as the FDM-based frequency interlace mapping shown in FIGS. 8B and 8C. For instances, UE A may transmit on even tones within RBs 210 of the frequency interlace $208_{I(O)}$ and UE B may transmit on odd tones within RBs 210 of the frequency interlace $208_{I(O)}$.

Figure 10:
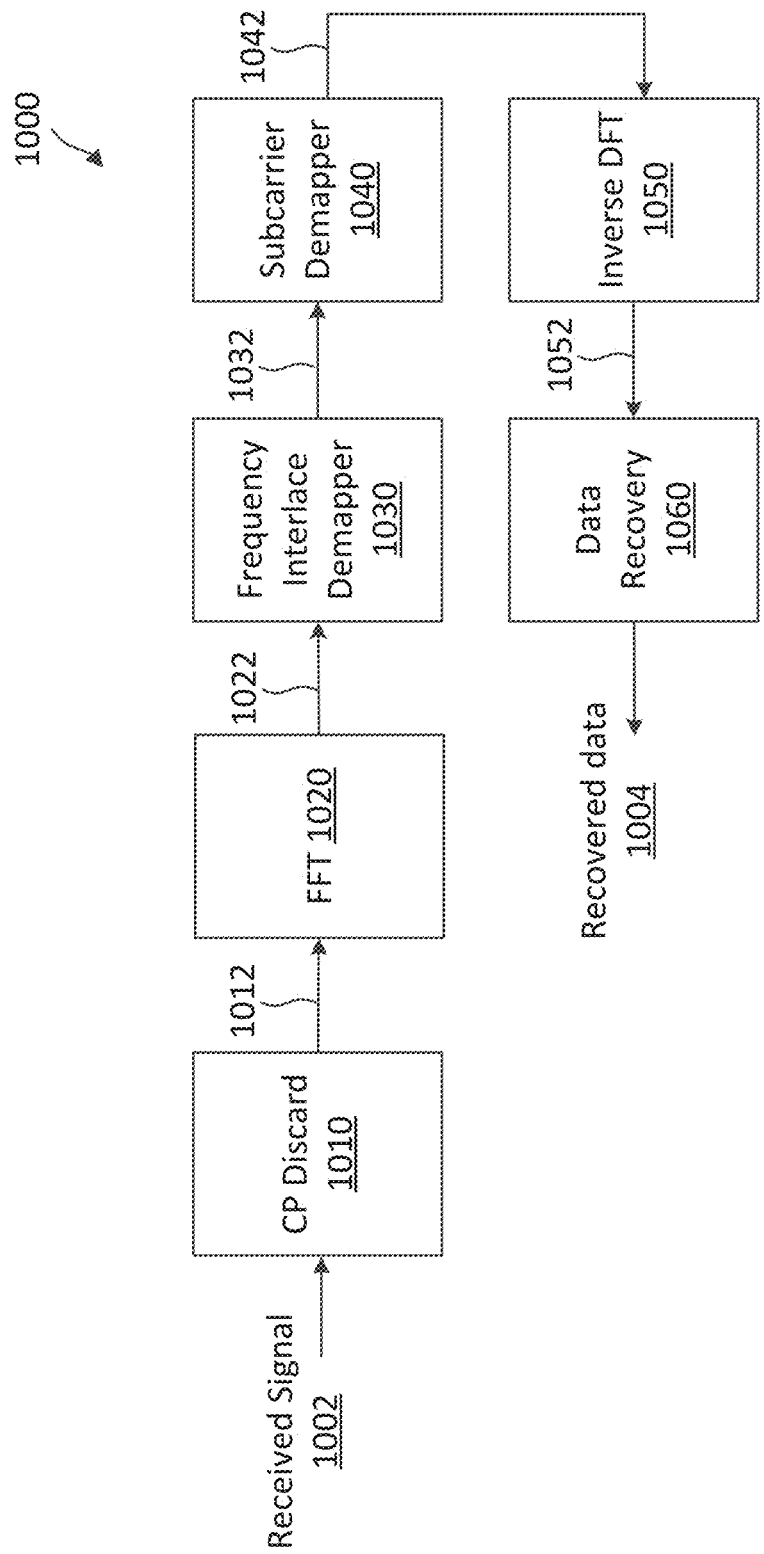
FIG. 10 illustrates a receive processing scheme for a DFT precoded interlace according to some embodiments of the present disclosure.

FIG. 10 illustrates a receive processing scheme 1000 for a DFT precoded interlace according to some embodiments of the present disclosure. The scheme 1000 may be employed by BSs such as the BSs 105 and 600 and UEs such as the UEs 115 and 500 in a network such as the network 100. For example, the scheme 1000 may be implemented by a receiver receiving a signal 1002 transmitted by a transmitter on a frequency interlace (e.g., the frequency interlace $208_{I(O)}$) using a pre-DFT-OCC as described in the scheme 900. The scheme 1000 includes a CP discard unit 1010, an FFT unit 1020, a frequency interlace demapper 1030, a subcarrier demapper 1040, an inverse DFT (IDFT) unit 1050, and a data recovery unit 1060.

The CP discard unit 1010 is configured to remove or discard CPs from the received signal 1002. The FFT unit 1020 is coupled to the CP discard unit 1010 and configured to perform an FFT on the CP-discarded signal 1012 to produce a frequency signal 1022. The frequency interlace demapper 1030 is coupled to the FFT unit 1020 and configured to extract the RBs (e.g., a set of distributed the RBs 210) corresponding to the frequency interlace $208_{I(O)}$ from the frequency signal 1022. The frequency interlace demapper 1030 produces a frequency signal 1032.

The subcarrier demapper 1040 is coupled to the frequency interlace demapper 1030 and configured to extract subcarriers (e.g., the subcarriers 212) from the set of extracted RBs (e.g., the frequency signal 1032) based on the OCC that the transmitter used for the transmission of the received signal 1002. The extracted subcarriers form a frequency signal 1042. As an example, when the transmitter uses an OCC similar to the OCC 710a {1, 1}, the subcarrier demapper 1040 extracts the even subcarriers from the set of extracted RBs. In other words, the subcarrier demapper 1040 forms a frequency signal 1042 from the extracted even subcarriers. Alternatively, when the transmitter uses an OCC similar to the OCC 710b {1, −1}, the subcarrier demapper 1040 extracts the odd subcarriers from the set of extracted RBs. In other words, the subcarrier demapper 1040 forms a frequency signal 1042 from the extracted odd subcarriers.

The IDFT unit 1050 is coupled to the subcarrier demapper 1040 and configured to perform an inverse DFT on the frequency signal 1042 to produce a time signal 1052. The data recovery unit 1060 is coupled to the IDFT unit 1050 and configured to recovery the original information transmitted by the transmitter from the time signal 1052. The data recovery operations may include time and/or frequency equalization, demodulation, and/or decoding.

As can be observed, the subcarrier demapper 1040 extracts the useful subcarriers corresponding to non-zero values of the DFT output (e.g., the DFT output 722a, 722b, 922a, and 922b) at the transmitter for data recovery processing and may discard or ignore other subcarriers corresponding to zero values (e.g., that does not carry useful information) of the DFT output at the transmitter.

In an implementation, the subcarrier demapper 1040 may extract the useful tones and the DFT of size equal to the number of useful subcarriers is performed. In another implementation, the subcarrier demapper 1040 may extract all tones of the interlace including non-useful subcarriers and OCC despreading may be performed at the data recovery unit 1060 post DFT. The DFT size in this case equals to the number of subcarriers (useful+ not useful) on the corresponding interlace.

Figure 11:
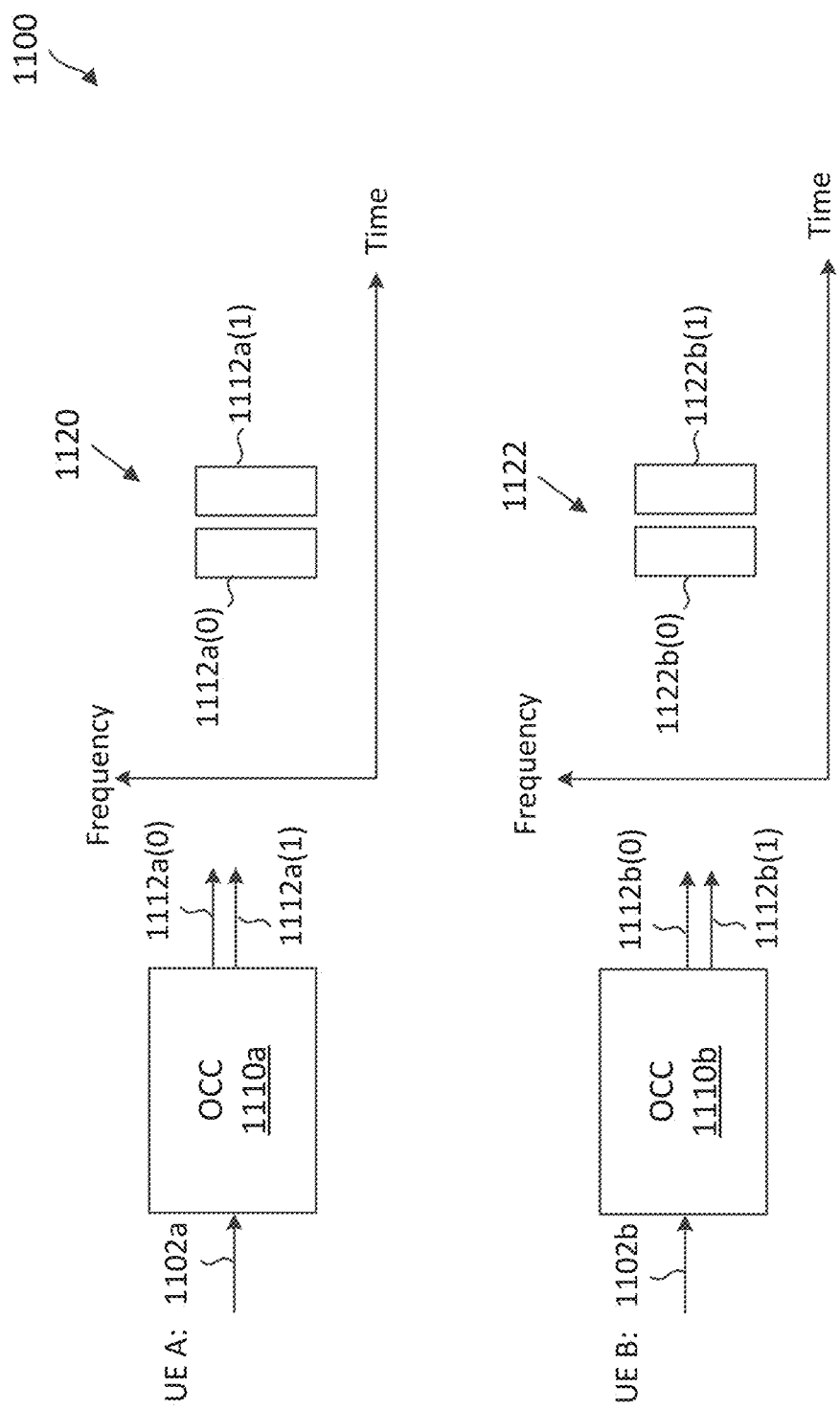
FIG. 11 illustrates a user multiplexing scheme that applies time-domain OCC across multiple single carrier-FDM (SC-FDM) symbols according to some embodiments of the present disclosure.

FIG. 11 illustrates a user multiplexing scheme 1100 that applies time-domain OCC across multiple SC-FDM symbols according to some embodiments of the present disclosure. In FIG. 11, the x-axes represent time in some constant units and the y-axes represent frequency in some constant units. The scheme 1100 may be employed by BSs such as the BSs 105 and 600 and UEs such as the UEs 115 and 500 in a network such as the network 100. The scheme 1100 can be used in conjunction with the scheme 900. The scheme 1110 can be applied after the scheme 900. For example, a BS may further multiplex transmission of a UE A and a UE B by configuring the UE A and the UE B to perform time-domain spreading using an OCC 1110a and an OCC 1110b, respectively. For example, the OCC 1110a may be represented by {C0=1, C=1} and the OCC 1110b may be represented by {C0=1, C1=−1}.

The UE A generates an output signal 1102a (e.g., an SC-FDM symbol) carrying information (e.g., the information symbols 310, 702, 704, 902, and 904) mapped to a certain frequency interlace (e.g., the frequency interlace $208_{I(0)}$), for example, using the scheme 900. The signal 1102a may correspond to the output signal 944a. The UE A applies the OCC 1110a to the signal 1102a to produce a time symbol 1112a(0) and a time symbol 1112a(1). For example, the UE A may multiply the signal 1102a by C0 of the OCC 1110a to produce the symbol 1112a(0) and multiply the signal 1102a by C1 of the OCC 1110a to produce the symbol 1112a(1). As shown in the plot 1120, the output signal 1102a is spread across two time symbols 1112a(0) and 1112a(1) (e.g., SC-FDM symbols) by the OCC 1110a.

The UE B generates an output signal 1102b (e.g., an SC-FDM symbol) carrying information (e.g., the information symbols 310, 712a, 712b, 912a, and 912b) mapped to the same frequency interlace (e.g., the frequency interlace $208_{I(0)}$) as the one used by the UE A, for example, using the scheme 900. The signal 1102b may correspond to the output signal 944b. The UE B applies the OCC 1110b to the signal 1102b to produce a time symbol 1112b(0) and a time symbol 1112b(1). For example, the UE B multiplies the signal 1102b by C0 of the OCC 1110b to produce the symbol 1112b(0) and multiplies the signal 1102b by C1 of the OCC 1110b to produce the symbol 1112b(1). As shown in the plot 1122, the output signal 1102b is spread across two time symbols 1112b(0) and 1112b(1) by the OCC 1110b.

Figure 12:
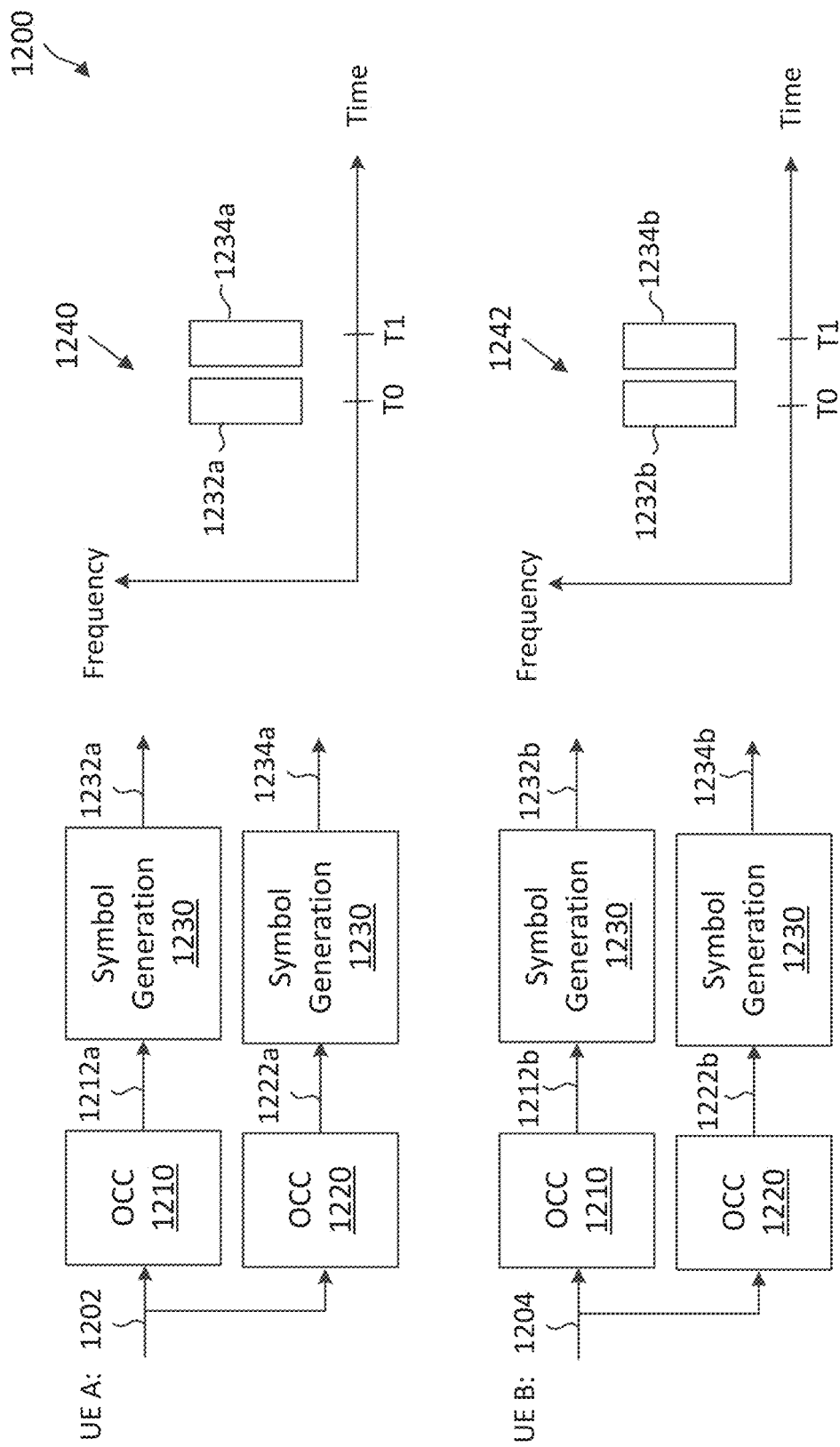
FIG. 12 illustrates a user multiplexing scheme that applies code-hopping across multiple SC-FDM symbols according to some embodiments of the present disclosure.

FIG. 12 illustrates a user multiplexing scheme 1200 that applies code-hopping across SC-FDM symbols according to some embodiments of the present disclosure. In FIG. 12, the x-axes represent time in some constant units and the y-axes represent frequency in some constant units. The scheme 1200 may be employed by BSs such as the BSs 105 and 600 and UEs such as the UEs 115 and 500 in a network such as the network 100. The scheme 1200 employs substantially similar mechanisms as in the scheme 900, but further applies code-hopping across multiple SC-FDM symbols. For example, a BS configures a UE A and a UE B to perform code-hopping in addition to pre-DFT-OCC spreading shown in the scheme 900. The BS may configure the UE A with a code-hop pattern, where an OCC 1210 is applied to a first symbol at time T0 and an OCC 1220 is applied to a next symbol at time T1. The BS may configure the UE B with a code-hop pattern different than the UE A code-hop pattern, where the OCC 1220 is applied to a first symbol at time T0 and the OCC 1210 applied to a next symbol at time T1. The OCC 1210 may be represented by {C0=1, C1=1} and the OCC 1220 may be represented by {C0=1, C1=−1}.

The UE A hops from the OCC 1210 to the OCC 1220. The UE A applies the OCC 1210 to block-spread a block of information symbols 1202 (e.g., the information symbols 310, 702a, and 902a) to form block-spread information symbols 1212a using the same mechanisms as described in the scheme 900. The UE A performs symbol generation 1230 on the block-spread information symbols 1212a to form an output symbol 1232a. The symbol generation 1230 may include processing of the DFT 720, the frequency interlace mapping 924, the IFFT 730, and the CP add operation 740 in order.

Next, the UE A applies the OCC 1220 to block-spread the information symbols 1202 to form block-spread symbols 1222a. The UE A performs symbol generation 1230 on the block-spread symbols 1222a to form an output symbol 1234a. As shown in the plot 1240, the UE A transmits the SC-FDM symbol 1232a at time T0 and the SC-FDM symbol 1234a at time T1, where code-hopping is applied across the symbols 1232a and 1234b.

The UE B hops from the OCC 1220 to the OCC 1210. The UE B applies the OCC 1220 to block-spread a block of information symbols 1204 (e.g., the information symbols 702a and 902a) to form block-spread symbols 1222b. The UE B performs symbol generation 1230 on the block-spread symbols 1222b to form an output symbol 1234b.

Next, the UE B applies the OCC 1210 to block-spread the information symbols 1204 to form block-spread information symbols 1212b. The UE B performs symbol generation 1230 on the block-spread information symbols 1212b to form an output symbol 1232b. As shown in the plot 1242, the UE B transmits the SC-FDM symbol 1234b at time T0 and the SC-FDM symbol 1232b at time T1, where code-hopping is applied across the symbols 1234b and 1234a. As can be seen in the scheme 1200, the code-hopping is applied across SC-FDM symbols with no time-domain OCC applied across the SC-FDM symbols.

While the schemes 900, 1000, 1100, and 1200 are described in the context of multiplexing two UEs (e.g., a UE A and a UE B) on a frequency interlace (e.g., the frequency interlaces 208) with OCCs (e.g., the OCCs 710a, 710b, 1110a, 1110b, and 1210, 1220) and of length 2, the schemes 900, 1000, 1100, 1200 may be applied to multiplex any suitable number of UEs (e.g., about 3, 4, or 6) on a frequency interlace and may vary the code length of the OCCs accordingly.

Figure 13:
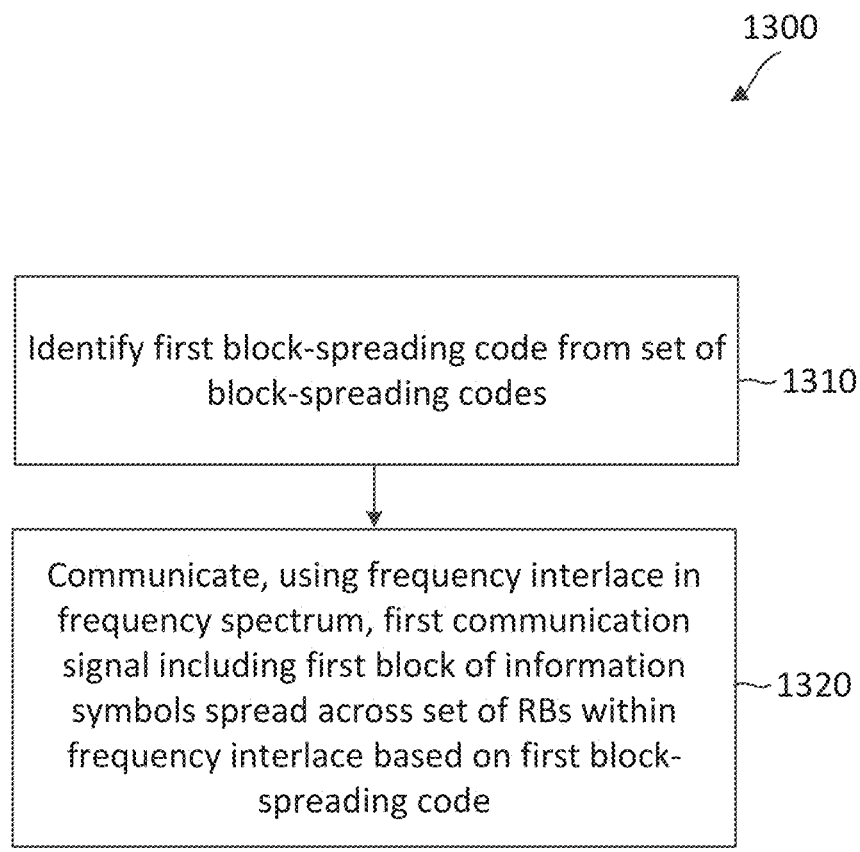
FIG. 13 is a flow diagram of a communication method using a DFT precoded frequency interlace according to some embodiments of the present disclosure.

FIG. 13 is a flow diagram of a communication method 1300 using a DFT precoded frequency interlace for transmissions according to some embodiments of the present disclosure. Steps of the method 1300 can be executed by a computing device (e.g., a processor, processing circuit, and/or other suitable component) of a wireless communication device, such as the BS 105 and the BS 600, may utilize one or more components, such as the processor 602, the memory 604, the pre-DFT-OCC-based communication module 608, the transceiver 610, and the one or more antennas 616, to execute the steps of method 1300. In another example, a wireless communication device, such as the UE 115 and the UE 500, may utilize one or more components, such as the processor 502, the memory 504, the pre-DFT-OCC-based communication module 508, the transceiver 510, and the one or more antennas 516, to execute the steps of method 1300. The method 1300 may employ similar mechanisms as in the schemes 700, 900, 1000, 1100, and 1200 described with respect to FIGS. 7, 9, 10, 11, and 12, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes identifying, by a first wireless communication device, a first block-spreading code from a set of block-spreading codes associated with user multiplexing. The set of block-spreading codes may be similar to the OCCs 710a and 710b or the OCCs 1210 and 1220.

At step 1320, the method 1300 includes communicating, by the first wireless communication device with a second wireless communication device using a frequency interlace (e.g., the frequency interlace 208) in a frequency spectrum (e.g., the frequency spectrum 202), a first communication signal (e.g., the output signals 944a and 944b and the time symbols 1112a, 1112b, 1232a, 1234a, 1232b, and 1234b) including a first block of information symbols (e.g., the information symbols 310, 902, 904, 1202, 1204) spread across a set of resource blocks (RBs) (e.g., the RBs 210) within the frequency interlace based on the first block-spreading code. In some instances, the first block of information symbols are modulation symbols carrying UCI.

In an embodiment, the first wireless communication device may correspond to a BS and the second wireless communication device may correspond to a UE. In such an embodiment, the first wireless communication device may further transmit a configuration to the second wireless communication device indicating the identified first block-spreading code.

In an embodiment, the first wireless communication device may correspond to a UE and the second wireless communication device may correspond to a BS. In such an embodiment, the first wireless communication device may further receive a configuration from the second wireless communication device indicating the identified first block-spreading code. The first wireless communication may identify the first block-spreading code based on the received configuration.

In an embodiment, the first block of information symbols is carried by a first set of subcarriers (e.g., the subcarriers 212) interlaced with a second set of subcarriers (e.g., the subcarriers 212) in the set of RBs (e.g., the RBs 210). For example, when the first block-spreading code is {1, 1}, the first set of subcarriers may correspond to even subcarriers in the set of RBs. Alternatively, when the first block-spreading code is {1, 1}, the first set of subcarriers may correspond to odd subcarriers in the set of RBs. In some other examples, the first block-spreading code may have a length of 4 or 6 and the first set of subcarriers may correspond to every fourth subcarrier or every sixth subcarrier, respectively, in the set of RBs.

In an embodiment, the first wireless communication device may communicate the first communication signal by transmitting, to the second wireless communication device, the first communication signal including the first block of information symbols carried by the first set of subcarriers.

In an embodiment, the first wireless communication device further generates the first communication signal by block-spreading the first block of information symbols based on the first block-spreading code to generate a first block of spread information symbols (e.g., the block-spread information symbols 912a, 912b, 1212a, 1212b, 1222a, and 1222b). After the block-spreading, the first wireless communication device performs a DFT (e.g., the DFTs 340 and 720) on the first block of spread information symbols to generate a frequency signal (e.g., the DFT outputs 922a and 922b). After performing the DFT, the first wireless communication device maps the frequency signal to the set of resource blocks (e.g., the frequency interlace mapping 924), wherein non-zero values of the frequency signal are located at the first set of subcarriers.

In an embodiment, the first block-spreading code includes at least a first code (e.g., C0 of the OCC 710a or 710b) and a second code (e.g., C1 of the OCC 710a or 710b). Each of the first code and the second code may be referred to as a code symbol. The first wireless communication device block-spreads the first block of information symbols by applying the first code to the first block of information symbols to generate a first block of coded information symbols and applying the second code to the first block of information symbols to generate a second block of coded information symbols. The first wireless communication device generates the first block of spread information symbols (e.g., the symbols 912a or 912b) based on at least the first block of coded information symbols and the second block of coded information symbols, for example, by concatenating the first and second blocks.

In an embodiment, the first wireless communication device may communicate the first communication signal by receiving, from the second wireless communication device, the first communication signal including the first block of information symbols carried by the first set of subcarriers. The first wireless communication device further performs an IDFT (e.g., the IDFT 1050) on the received first communication signal (e.g. the received signal 1002) based on the first set of subcarriers to recover the first block of information symbols, for example, using similar mechanisms as described in the scheme 1000.

In an embodiment, the first wireless communication device identifies a second block-spreading code from the set of block-spreading codes. The wireless communication device communicates, with a third wireless communication device different from the second wireless communication device, a second communication signal concurrent with the first communication signal, the second communication signal including a second block of information symbols spread across the frequency interlace based on the second block-spreading code. The second block of information symbols is carried by the second set of subcarriers. For example, the first wireless communication device corresponds to a BS, the second wireless communication device corresponds to a UE A, and the third wireless communication device corresponds to a UE B.

In an embodiment, the first communication signal is further communicated based on a time-domain spreading code (e.g., the OCCs 1110a and 1110b), for example, using the scheme 1100.

In an embodiment, the first wireless communication device identifies the first block-spreading code by applying a code-hopping pattern to the set of block-spreading codes, for example, using the scheme 1200.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising identifying, by a first wireless communication device, a first block-spreading code from a set of block-spreading codes associated with user multiplexing; and communicating, by the first wireless communication device with a second wireless communication device using a frequency interlace in a frequency spectrum, a first communication signal including a first block of information symbols spread across a set of resource blocks (RBs) within the frequency interlace based on the first block-spreading code.

In some embodiments, wherein the set of block-spreading codes includes orthogonal cover codes (OCCs). In some embodiments, wherein the first block of information symbols is carried by a first set of subcarriers interlaced with a second set of subcarriers in the set of RBs. In some embodiments, wherein the communicating includes transmitting, by the first wireless communication device to the second wireless communication device, the first communication signal including the first block of information symbols carried by the first set of subcarriers. In some embodiments, the method further comprises generating, by the first wireless communication device, the first communication signal by block-spreading the first block of information symbols based on the first block-spreading code to generate a first block of spread information symbols; performing a discrete Fourier transform (DFT) on the first block of spread information symbols to generate a frequency signal; and mapping the frequency signal to the set of RBs, wherein non-zero values of the frequency signal are located at the first set of subcarriers. In some embodiments, wherein the first block-spreading code includes at least a first code and a second code, and wherein the block-spreading the first block of information symbols includes applying the first code to the first block of information symbols to generate a first block of coded information symbols; applying the second code to the first block of information symbols to generate a second block of coded information symbols; and generating the first block of spread information symbols based on at least the first block of coded information symbols and the second block of coded information symbols. In some embodiments, wherein the communicating includes receiving, by the first wireless communication device from the second wireless communication device, the first communication signal including the first block of information symbols carried by the first set of subcarriers. In some embodiments, the method further comprises performing, by the first wireless communication device, an inverse discrete Fourier transform (IDFT) on the received first communication signal based on the first set of subcarriers to recover the first block of information symbols. In some embodiments, the method further comprises identifying, by the first wireless communication device, a second block-spreading code from the set of block-spreading codes; and communicating, by the first wireless communication device with a third wireless communication device, a second communication signal concurrent with the first communication signal, the second communication signal including a second block of information symbols spread across the frequency interlace based on the second block-spreading code, wherein the second block of information symbols is carried by the second set of subcarriers, and wherein the third wireless communication device is different from the second wireless communication device. In some embodiments, wherein the communicating is further based on a time-domain spreading code. In some embodiments, wherein the identifying includes applying, by the first wireless communication device, a code-hopping pattern to the set of block-spreading codes. In some embodiments, wherein the first block of information symbols are modulation symbols including uplink control channel information.

Further embodiments of the present disclosure include an apparatus comprising a processor configured to identify a first block-spreading code from a set of block-spreading codes associated with user multiplexing; and a transceiver configured to communicate, with a first wireless communication device using a frequency interlace in a frequency spectrum, a first communication signal including a first block of information symbols spread across a set of resource blocks (RBs) within the frequency interlace based on the first block-spreading code.

In some embodiments, wherein the set of block-spreading codes includes orthogonal cover codes (OCCs). In some embodiments, wherein the first block of information symbols is carried by a first set of subcarriers interlaced with a second set of subcarriers in the set of RBs. In some embodiments, wherein the transceiver is further configured to communicate the first communication signal by transmitting, to the first wireless communication device, the first communication signal including the first block of information symbols carried by the first set of subcarriers. In some embodiments, wherein the processor is further configured to generate the first communication signal by block-spreading the first block of information symbols based on the first block-spreading code to generate a first block of spread information symbols; performing a discrete Fourier Transform (DFT) on the first block of spread information symbols to generate a frequency signal; and mapping the frequency signal to the set of RBs, wherein non-zero values of the frequency signal are located at the first set of subcarriers. In some embodiments, wherein the first block-spreading code includes at least a first code and a second code, and wherein the processor is further configured to block-spread the first block of information symbols by applying the first code to the first block of information symbols to generate a first block of coded information symbols; applying the second code to the first block of information symbols to generate a second block of coded information symbols; and generating the first block of spread information symbols based on at least the first block of coded information symbols and the second block of coded information symbols. In some embodiments, wherein the transceiver is further configured to communicate the first communication signal by receiving, from the first wireless communication device, the first communication signal including the first block of information symbols carried by the first set of subcarriers. In some embodiments, wherein the processor is further configured to perform an inverse discrete Fourier transform (IDFT) on the received first communication signal based on the first set of subcarriers to recover the first block of information symbols. In some embodiments, wherein the processor is further configured to identify a second block-spreading code from the set of block-spreading codes, and the transceiver is further configured to communicate, with a second wireless communication device, a second communication signal concurrent with the first communication signal, the second communication signal including a second block of information symbols spread across the frequency interlace based on the second block-spreading code, wherein the second block of information symbols is carried by the second set of subcarriers, and wherein the second wireless communication device is different from the first wireless communication device. In some embodiments, wherein the first communication signal is further communicated based on a time-domain spreading code. In some embodiments, wherein the processor is further configured to identify the first block-spreading code by applying a code-hopping pattern to the set of block-spreading codes. In some embodiments, wherein the first block of information symbols are modulation symbols including uplink control channel information.

Further embodiments of the present disclosure include a computer-readable medium having program code recorded thereon, the program code comprising code for causing a first wireless communication device to identify a first block-spreading code from a set of block-spreading codes associated with user multiplexing; and code for causing the first wireless communication device to communicate, with a second wireless communication device using a frequency interlace in a frequency spectrum, a first communication signal including a first block of information symbols spread across a set of resource blocks (RBs) within the frequency interlace based on the first block-spreading code.

In some embodiments, wherein the set of block-spreading codes includes orthogonal cover codes (OCCs). In some embodiments, wherein the first block of information symbols is carried by a first set of subcarriers interlaced with a second set of subcarriers in the set of RBs. In some embodiments, wherein the code for causing the first wireless communication device to communicate first communication signal is further configured to transmit, to the second wireless communication device, the first communication signal including the first block of information symbols carried by the first set of subcarriers. In some embodiments, the computer-readable medium further comprises code for causing the first wireless communication device to generate the first communication signal by block-spreading the first block of information symbols based on the first block-spreading code to generate a first block of spread information symbols; performing a discrete Fourier transform (DFT) on the first block of spread information symbols to generate a frequency signal; and mapping the frequency signal to the set of RBs, wherein non-zero values of the frequency signal are located at the first set of subcarriers. In some embodiments, wherein the first block-spreading code includes at least a first code and a second code, and wherein the code for causing the first wireless communication device to block-spread the first block of information symbols is further configured to apply the first code to the first block of information symbols to generate a first block of coded information symbols; apply the second code to the first block of information symbols to generate a second block of coded information symbols; and generate the first block of spread information symbols based on at least the first block of coded information symbols and the second block of coded information symbols. In some embodiments, wherein the code for causing the first wireless communication device to communicate first communication signal is further configured to receive, from the second wireless communication device, the first communication signal including the first block of information symbols carried by the first set of subcarriers. In some embodiments, the computer-readable medium further comprises code for causing the first wireless communication device to perform an inverse discrete Fourier transform (IDFT) on the received first communication signal based on the first set of subcarriers to recover the first block of information symbols. In some embodiments, the computer-readable medium further comprises code for causing the first wireless communication device to identify a second block-spreading code from the set of block-spreading codes; and code for causing the first wireless communication device to communicate, with a third wireless communication device, a second communication signal concurrent with the first communication signal, the second communication signal including a second block of information symbols spread across the frequency interlace based on the second block-spreading code, wherein the second block of information symbols is carried by the second set of subcarriers, and wherein the third wireless communication device is different from the second wireless communication device. In some embodiments, wherein the code for causing the first wireless communication device to communicate the first communication signal is further configured to communicate the first communication signal based on a time-domain spreading code. In some embodiments, wherein the code for causing the first wireless communication device to identify the first block-spreading code is further configured to apply a code-hopping pattern to the set of block-spreading codes. In some embodiments, wherein the first block of information symbols are modulation symbols including uplink control channel information.

Further embodiments of the present disclosure include an apparatus comprising means for identifying a first block-spreading code from a set of block-spreading codes associated with user multiplexing; and means for communicating, with a first wireless communication device using a frequency interlace in a frequency spectrum, a first communication signal including a first block of information symbols spread across a set of resource blocks (RBs) within the frequency interlace based on the first block-spreading code.

In some embodiments, wherein the set of block-spreading codes includes orthogonal cover codes (OCCs). In some embodiments, wherein the first block of information symbols is carried by a first set of subcarriers interlaced with a second set of subcarriers in the set of RBs. In some embodiments, wherein the means for communicating the first communication signal is further configured to transmit, to the first wireless communication device, the first communication signal including the first block of information symbols carried by the first set of subcarriers. In some embodiments, the apparatus further comprises means for generating the first communication signal by block-spreading the first block of information symbols based on the first block-spreading code to generate a first block of spread information symbols; performing a discrete Fourier transform (DFT) on the first block of spread information symbols to generate a frequency signal; and mapping the frequency signal to the set of RBs, wherein non-zero values of the frequency signal are located at the first set of subcarriers. In some embodiments, wherein the first block-spreading code includes at least a first code and a second code, and wherein the means for generating the first communication signal is further configured to apply the first code to the first block of information symbols to generate a first block of coded information symbols; apply the second code to the first block of information symbols to generate a second block of coded information symbols; and generate the first block of spread information symbols based on at least the first block of coded information symbols and the second block of coded information symbols. In some embodiments, wherein the means for communicating the first communication signal is further configured to receive, from the first wireless communication device, the first communication signal including the first block of information symbols carried by the first set of subcarriers. In some embodiments, the apparatus of further comprises means for performing an inverse discrete Fourier transform (IDFT) on the received first communication signal based on the first set of subcarriers to recover the first block of information symbols. In some embodiments, the apparatus further comprises means for identifying a second block-spreading code from the set of block-spreading codes; and means for communicating, with a second wireless communication device, a second communication signal concurrent with the first communication signal, the second communication signal including a second block of information symbols spread across the frequency interlace based on the second block-spreading code, wherein the second block of information symbols is carried by the second set of subcarriers, and wherein the second wireless communication device is different from the first wireless communication device. In some embodiments, wherein the means for communicating the first communication signal is further configured to communicate the first communication signal based on a time-domain spreading code. In some embodiments, wherein the means for identifying the first block-spreading code is further configured to apply a code-hopping pattern to the set of block-spreading codes. In some embodiments, wherein the first block of information symbols are modulation symbols including uplink control channel information.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   identifying, by a first wireless communication device, a first block-spreading code from a set of block-spreading codes associated with user multiplexing;
   generating, by the first wireless communication device, a first communication signal by:
      block-spreading a first block of information symbols based on the first block-spreading code to generate a first block of spread information symbols;
      performing a discrete Fourier transform (DFT) on the first block of spread information symbols to generate a frequency signal; and
      mapping the frequency signal to a set of resource blocks (RBs), wherein non-zero values of the frequency signal are located at a first set of subcarriers; and
   communicating, by the first wireless communication device with a second wireless communication device using a frequency interlace in a frequency spectrum, the first communication signal including the first block of information symbols spread across the set of RB within the frequency interlace based on the first block-spreading code, wherein the first block of information symbols is carried by the first set of subcarriers interlaced with a second set of subcarriers in the set of RBs.

2. The method of claim 1, wherein the set of block-spreading codes includes orthogonal cover codes (OCCs).

3. The method of claim 1, wherein the set of block-spreading codes includes a discrete Fourier transform (DFT) sequence.

4. The method of claim 1, wherein the first block-spreading code is an orthogonal cover code (OCC) including at least a first code symbol and a second code symbol, and wherein the block-spreading the first block of information symbols includes:
   applying the first code symbol to the first block of information symbols to generate a first block of coded information symbols;
   applying the second code symbol to the first block of information symbols to generate a second block of coded information symbols; and
   generating the first block of spread information symbols based on at least the first block of coded information symbols and the second block of coded information symbols.

5. The method of claim 4, wherein the generating the first block of spread information symbols includes:
   concatenating the first block of coded information symbols with the second block of coded information symbols.

6. The method of claim 1, wherein the communicating includes:
  communicating, by the first wireless communication device with the second wireless communication device, a single carrier-frequency division multiplexing (SC-FDM) waveform signal carrying the first block of spread information symbols.

7. The method of claim 1, wherein:
  the communicating the first communication signal includes:
    receiving, by the first wireless communication device from the second wireless communication device, the first communication signal based on the first block-spreading code; and
  the method further comprises:
    identifying, by the first wireless communication device, a second block-spreading code from the set of block-spreading codes; and
    receiving, by the first wireless communication device from a third wireless communication device different from the second wireless communication device, a second communication signal concurrent with the first communication signal, the second communication signal including a second block of information symbols spread across the frequency interlace based on the second block-spreading code, the second block of information symbols carried by the second set of subcarriers.

8. The method of claim 1, wherein the communicating is further based on a time-domain spreading code.

9. The method of claim 1, wherein the identifying includes:
  applying, by the first wireless communication device, a code-hopping pattern to the set of block-spreading codes.

10. The method of claim 9, wherein the communicating is not based on a time-domain spreading code.

11. The method of claim 1, wherein the first block of information symbols are modulation symbols including uplink control channel information.

12. An apparatus comprising:
  a processor configured to:
    identify a first block-spreading code from a set of block-spreading codes associated with user multiplexing; and
    generate a first communication signal by:
      block-spreading a first block of information symbols based on the first block-spreading code to generate a first block of spread information symbols;
      performing a discrete Fourier transform (DFT) on the first block of spread information symbols to generate a frequency signal; and
      mapping the frequency signal to a set of resource blocks (RBs), wherein non-zero values of the frequency signal are located at a first set of subcarriers; and
  a transceiver configured to:
    communicate, with a first wireless communication device using a frequency interlace in a frequency spectrum, the first communication signal including the first block of information symbols spread across the set of RB within the frequency interlace based on the first block-spreading code, wherein the first block of information symbols is carried by the first set of subcarriers interlaced with a second set of subcarriers in the set of RBs.

13. The apparatus of claim 12, wherein the set of block-spreading codes includes orthogonal cover codes (OCCs).

14. The apparatus of claim 12, wherein the first block-spreading code is an orthogonal cover code (OCC) including at least a first code symbol and a second code symbol, and wherein the processor is further configured to block-spread the first block of information symbols by:
  applying the first code symbol to the first block of information symbols to generate a first block of coded information symbols;
  applying the second code symbol to the first block of information symbols to generate a second block of coded information symbols; and
  generating the first block of spread information symbols based on at least the first block of coded information symbols and the second block of coded information symbols.

15. The apparatus of claim 12, wherein:
  the transceiver configured to communicate the first communication signal is further configured to receive, from the first wireless communication device, the first communication signal based on the first block-spreading code;
  the processor is further configured to identify a second block-spreading code from the set of block-spreading codes; and
  the transceiver is further configured to communicate, with a second wireless communication device different from the first wireless communication device, a second communication signal concurrent with the first communication signal, the second communication signal including a second block of information symbols spread across the frequency interlace based on the second block-spreading code, the second block of information symbols carried by the second set of subcarriers.

16. The apparatus of claim 12, wherein the first communication signal is further communicated based on a time-domain spreading code.

17. The apparatus of claim 12, wherein the processor configured to identify the first block-spreading code is further configured to:
  applying a code-hopping pattern to the set of block-spreading codes.

18. The apparatus of claim 17, wherein the first communication signal is not communicated based on a time-domain spreading code.

19. The apparatus of claim 12, wherein the first block of information symbols are modulation symbols including uplink control channel information.

20. A non-transitory computer-readable medium having program code recorded thereon, the program code comprising:
  code for causing a first wireless communication device to identify a first block-spreading code from a set of block-spreading codes associated with user multiplexing;
  code for causing the first wireless communication device to generate a first communication signal by:
    block-spreading a first block of information symbols based on the first block-spreading code to generate a first block of spread information symbols;
    performing a discrete Fourier transform (DFT) on the first block of spread information symbols to generate a frequency signal; and
    mapping the frequency signal to a set of resource blocks (RBs), wherein non-zero values of the frequency signal are located at a first set of subcarriers; and code for causing the first wireless communication device to communicate, with a second wireless communication device using a frequency interlace in a frequency spectrum, the first communication signal including the first block of information symbols spread across the set of RB within the frequency interlace based on the first block-spreading code, wherein the first block of information symbols is carried by a first set of subcarriers interlaced with a second set of subcarriers in the set of RBs.

21. The non-transitory computer-readable medium of claim 20, wherein the set of block-spreading codes includes orthogonal cover codes (OCCs).

22. The non-transitory computer-readable medium of claim 20, wherein:

the code for causing the first wireless communication device to communicate the first communication signal is further configured to:

receive, from the first wireless communication device, the first communication signal based on the first block-spreading code; and the non-transitory computer-readable medium further comprises:

code for causing the first wireless communication device to identify a second block-spreading code from the set of block-spreading codes; and code for causing the first wireless communication device to communicate, with a third wireless communication device, a second communication signal concurrent with the first communication signal, the second communication signal including a second block of information symbols spread across the frequency interlace based on the second block-spreading code, the second block of information symbols carried by the second set of subcarriers.

23. The non-transitory computer-readable medium of claim 20, wherein the code for causing the first wireless communication device to communicate the first communication signal is further configured to communicate the first communication signal based on a time-domain spreading code.

24. The non-transitory computer-readable medium of claim 20, wherein the code for causing the first wireless communication device to identify the first block-spreading code is further configured to:

apply a code-hopping pattern to the set of block-spreading codes.

\* \* \* \* \*